United States Patent
Siddiq

(10) Patent No.: US 11,789,979 B2
(45) Date of Patent: *Oct. 17, 2023

(54) RELATIONAL DATABASE RETRIEVAL PROCEDURES FOR COHORT-WISE DATA COMPARISONS

(71) Applicant: Optum Health Solutions (UK) Limited, London (GB)

(72) Inventor: Imran Siddiq, Leicestershire (GB)

(73) Assignee: Optum Health Solutions (UK) Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,501

(22) Filed: Jun. 6, 2022

(65) Prior Publication Data

US 2022/0300535 A1 Sep. 22, 2022

Related U.S. Application Data

(63) Continuation of application No. 17/072,546, filed on Oct. 16, 2020, now Pat. No. 11,372,892.

(Continued)

(51) Int. Cl.
*G06F 16/28* (2019.01)
*G06F 16/242* (2019.01)
(Continued)

(52) U.S. Cl.
CPC ........ *G06F 16/284* (2019.01); *G06F 16/2282* (2019.01); *G06F 16/244* (2019.01); *G06F 16/24553* (2019.01); *G06F 16/24578* (2019.01)

(58) Field of Classification Search
CPC ............. G06F 16/285; G06F 16/24578; G06F 16/244; G06F 16/284; G06F 16/24528
(Continued)

(56) References Cited

U.S. PATENT DOCUMENTS 8,321,398 B2  11/2012  Aumann et al.
8,793,618 B2   7/2014  Martin et al.
(Continued)

OTHER PUBLICATIONS

"NHS RightCare—NHS RightCare Intelligence Tools and Support," NHS, (2 pages), (Online). [Retrieved from the Internet Jan. 2, 2020] <URL: https://www.england.nhs.uk/rightcare/products/nhs-rightcare-intelligence-tools-and-support/>.

(Continued)

*Primary Examiner* — Robert W Beausoliel, Jr.
*Assistant Examiner* — Pedro J Santos
(74) *Attorney, Agent, or Firm* — ALSTON & BIRD LLP

(57) ABSTRACT

Embodiments of the present disclosure provide methods, apparatus, systems, computing devices, and computing entities for generating a comparison data value for each attribute of interest for one or more attributes of interest associated with a dataset. In one embodiment, a method is provided comprising: importing the dataset into a database environment; executing a SQL procedure to aggregate records in the dataset into attribute data items, wherein each item comprises an aggregate data value for each attribute of interest; and for each item: executing the SQL procedure to (1) generate a standardized data value for each attribute of interest based on the aggregate data value; (2) identify a cohort; (3) generate a statistical data value for each attribute of interest with respect to the cohort; and (4) generate the comparison data value for each attribute of interest based on a comparison between the standardized data value and the statistical data value.

20 Claims, 12 Drawing Sheets

Related U.S. Application Data

Figure 1:
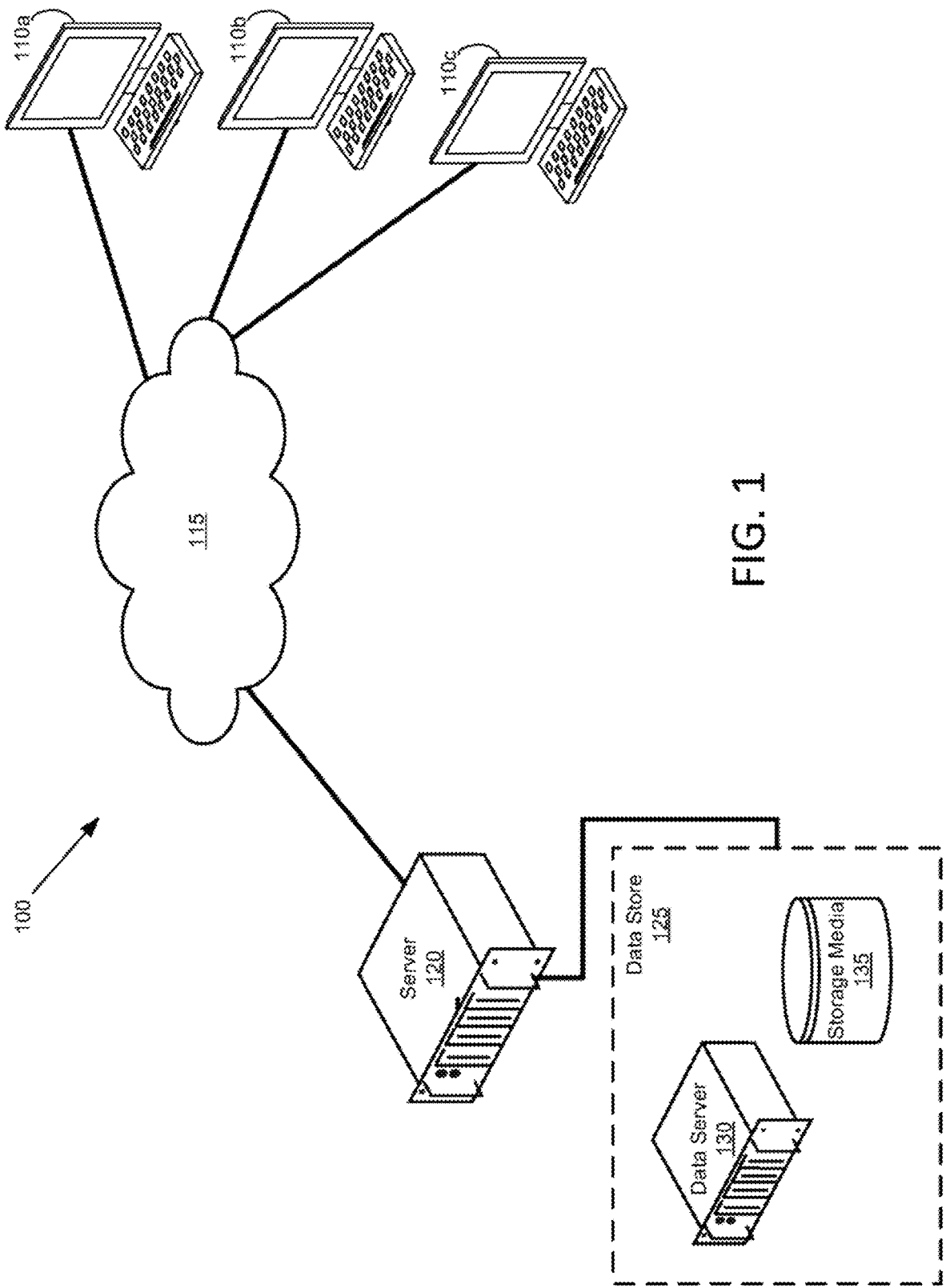

(60) Provisional application No. 62/916,299, filed on Oct. 17, 2019.

(51) Int. Cl.
   *G06F 16/2457*   (2019.01)
   *G06F 16/22*     (2019.01)
   *G06F 16/2455*   (2019.01)

(58) Field of Classification Search
   USPC .................................. 707/748, 749, 737
   See application file for complete search history.

(56) References Cited

U.S. PATENT DOCUMENTS

| | | | |
|---|---|---|---|
| 9,058,635 B1 | 6/2015 | Rybkin | |
| 9,202,249 B1 * | 12/2015 | Cohen | H04L 63/145 |
| 10,505,825 B1 * | 12/2019 | Bettaiah | G06F 40/174 |
| 10,636,516 B2 | 4/2020 | Cohen et al. | |
| 10,679,741 B1 | 6/2020 | Hernandez et al. | |
| 10,685,743 B2 | 6/2020 | Ginsburg et al. | |
| 11,372,892 B2 | 6/2022 | Siddiq | |
| 2010/0131498 A1 | 5/2010 | Linthicum et al. | |
| 2013/0304499 A1 | 11/2013 | Rangadass | |
| 2016/0203269 A1 | 7/2016 | Breitenstein et al. | |
| 2016/0253461 A1 | 9/2016 | Sohr et al. | |
| 2016/0283676 A1 | 9/2016 | Lyon et al. | |
| 2017/0124119 A1 | 5/2017 | Boncyk et al. | |
| 2017/0154288 A1 | 6/2017 | Barnum et al. | |
| 2018/0039629 A1 | 2/2018 | Arsikere et al. | |
| 2019/0355447 A1 | 11/2019 | Barkol et al. | |
| 2020/0320075 A1 | 10/2020 | Yan et al. | |

OTHER PUBLICATIONS

Al-Hajj, Samar et al. "Interactive Dashboards: Using Visual Analytics For Knowledge Transfer and Decision Support," In Proceedings of the 2013 Workshop on Visual Analytics in Healthcare, vol. 16, Nov. 16, 2013, (8 pages), Washington, D.C., USA.

Bartlett, Jamie et al. "Governance By Dashboard: A Policy Paper," Demos, (2017), (32 pages).

Turner, Mark. "Healthstat: Measuring the Performance of The Irish Public Health Service," Journal of the Statistical and Social Inquiry Society of Ireland, vol. 38, (2009), pp. 178-204.

* cited by examiner

RELATIONAL DATABASE RETRIEVAL PROCEDURES FOR COHORT-WISE DATA COMPARISONS

CROSS-REFERENCE TO RELATED APPLICATIONS

This application is a continuation of U.S. Non-Provisional patent application Ser. No. 17/072,546, filed Oct. 16, 2020, which claims the benefit of U.S. Provisional Patent Application Ser. No. 62/916,299, filed Oct. 17, 2019, both of which are incorporated herein by reference in their entireties, including any figures, tables, and drawings.

REFERENCE TO COMPUTER PROGRAM LISTING APPENDIX

A computer program listing has been submitted herewith as ASCII files via EFS-Web pursuant to MPEP 608.05(a) in which the contents of each file are incorporated herein by reference in their entirety. The names of the ASCII files include "Computer_Listing_1_of_6_sp_RightCare_Master.txt," created Oct. 14, 2020, and having size of 8906 bytes, "Computer_Listing_2_of_6_sp_RightCare_HES.txt," created Oct. 14, 2020, and having size of 61885 bytes, "Computer_Listing_3_of_6_sp_RightCare_QOF.txt," created Oct. 14, 2020, and having size of 8487 bytes, "Computer_Listing_4_of_6_sp_RightCare_QOF_Practice_Data.txt," created Oct. 14, 2020, and having size of 9640 bytes, "Computer_Listing_5_of_6_sp_RightCare_Prescribing_Data_Full.txt," created Oct. 14, 2020, and having size of 11858 bytes, and "Computer_Listing_6_of_6_sp_RightCare_Prescribing.txt," created Oct. 14, 2020, and having size of 21282 bytes.

BACKGROUND

Embodiments of the present disclosure generally relate to processing large datasets in an efficient manner to facilitate performing statistical comparison analysis between members of a cohort.

BRIEF SUMMARY

In general, embodiments of the present disclosure provide methods, apparatus, systems, computing devices, computing entities, and/or the like for generating a comparison data value for each attribute of interest for one or more attributes of interest associated with a population dataset comprising a plurality of records associated with a plurality of primary data groups. In accordance with one aspect of the present disclosure, a method for generating a comparison data value for each attribute of interest for one or more attributes of interest associated with a population dataset comprising a plurality of records associated with a plurality of primary data groups is provided. In various embodiments, the method comprises: importing the population dataset into a database environment; executing at least one structured query language (SQL) procedure within the database environment via a computing entity to aggregate the plurality of records into a plurality of attribute data items, wherein: (i) each attribute data item of the plurality of attribute data items (a) is associated with an attribute data item identifier, an associated aggregate data group of a plurality of aggregate data groups, and an associated primary data group of the plurality of primary data groups, and (b) comprises an aggregate data value for each attribute of interest of the one or more attributes of interest, and (ii) each aggregate data value for a particular attribute of interest in a particular attribute data item is determined based at least in part on a subset of data values for the particular attribute of interest in the plurality of records of the population dataset that relate to the associated aggregate data group for the particular attribute data item and the associated primary data group for the particular attribute data item; for each attribute data item of the plurality of attribute data items: executing the at least one SQL procedure within the database environment via the computing entity to generate a standardized data value for each attribute of interest of the one or more attributes of interest with respect to the attribute data item based at least in part on the aggregate data value for the attribute of interest; executing the at least one SQL procedure within the database environment via a computing entity to identify a cohort for the attribute data item based at least in part on the associated primary data group for the attribute data item, wherein the cohort comprises one or more peer primary data groups of the plurality of primary data groups for the attribute data item; executing the at least one SQL procedure within the database environment via the computing entity to generate a statistical data value for each attribute of interest of the one or more attributes of interest with respect to the cohort for the attribute data item, wherein at least one SQL procedure is configured to generate each statistical data value based at least in part on each standardized data value for one or more of the one or more peer primary data groups for the attribute data item; and executing the at least one SQL procedure within the database environment via the computing entity to generate the comparison data value for each attribute of interest of the one or more attributes of interest for with respect to the attribute data item, wherein the comparison data value represents a comparison between the standardized data value generated for the attribute of interest for the attribute data item and the statistical data value generated for the attribute of interest with respect to the cohort for the attribute data item; and providing a user interface for displaying via a user computing entity, wherein the user interface comprises, for each attribute data item of one or more of the plurality of attribute data items for an aggregate data group of the plurality of aggregate data groups, (i) the attribute data item identifier and (ii) the comparison data value for each attribute of interest of the one or more attributes of interest for each attribute data item.

In accordance with another aspect of the present disclosure, an apparatus is provided. In various embodiments, the apparatus comprises at least one processor and at least one memory comprising computer program code. The at least one memory and the program code are configured to, with the at least one processor, cause the apparatus to: import the population dataset into a database environment; execute at least one structured query language (SQL) procedure within the database environment to aggregate the plurality of records into a plurality of attribute data items, wherein: (i) each attribute data item of the plurality of attribute data items (a) is associated with an attribute data item identifier, an associated aggregate data group of a plurality of aggregate data groups, and an associated primary data group of the plurality of primary data groups, and (b) comprises an aggregate data value for each attribute of interest of the one or more attributes of interest, and (ii) each aggregate data value for a particular attribute of interest in a particular attribute data item is determined based at least in part on a subset of data values for the particular attribute of interest in the plurality of records of the population dataset that relate to the associated aggregate data group for the particular attribute data item and the associated primary data group for the particular attribute data item; for each attribute data item of the plurality of attribute data items: execute the at least one SQL procedure within the database environment to generate a standardized data value for each attribute of interest of the one or more attributes of interest with respect to the attribute data item based at least in part on the aggregate data value for the attribute of interest; execute the at least one SQL procedure within the database environment to identify a cohort for the attribute data item based at least in part on the associated primary data group for the attribute data item, wherein the cohort comprises one or more peer primary data groups of the plurality of primary data groups for the attribute data item; execute the at least one SQL procedure within the database environment to generate a statistical data value for each attribute of interest of the one or more attributes of interest with respect to the cohort for the attribute data item, wherein at least one SQL procedure is configured to generate each statistical data value based at least in part on each standardized data value for one or more of the one or more peer primary data groups for the attribute data item; and execute the at least one SQL procedure within the database environment to generate the comparison data value for each attribute of interest of the one or more attributes of interest for with respect to the attribute data item, wherein the comparison data value represents a comparison between the standardized data value generated for the attribute of interest for the attribute data item and the statistical data value generated for the attribute of interest with respect to the cohort for the attribute data item; and provide a user interface for displaying via a user computing entity, wherein the user interface comprises, for each attribute data item of one or more of the plurality of attribute data items for an aggregate data group of the plurality of aggregate data groups, (i) the attribute data item identifier and (ii) the comparison data value for each attribute of interest of the one or more attributes of interest for each attribute data item.

In accordance with yet another aspect of the present disclosure, a non-transitory computer storage medium is provided. In various embodiments, the non-transitory computer storage medium comprises instructions stored thereon. The instructions being configured to cause one or more processors to at least perform operations configured to: import the population dataset into a database environment; execute at least one structured query language (SQL) procedure within the database environment to aggregate the plurality of records into a plurality of attribute data items, wherein: (i) each attribute data item of the plurality of attribute data items (a) is associated with an attribute data item identifier, an associated aggregate data group of a plurality of aggregate data groups, and an associated primary data group of the plurality of primary data groups, and (b) comprises an aggregate data value for each attribute of interest of the one or more attributes of interest, and (ii) each aggregate data value for a particular attribute of interest in a particular attribute data item is determined based at least in part on a subset of data values for the particular attribute of interest in the plurality of records of the population dataset that relate to the associated aggregate data group for the particular attribute data item and the associated primary data group for the particular attribute data item; for each attribute data item of the plurality of attribute data items: execute the at least one SQL procedure within the database environment to generate a standardized data value for each attribute of interest of the one or more attributes of interest with respect to the attribute data item based at least in part on the aggregate data value for the attribute of interest; execute the at least one SQL procedure within the database environment to identify a cohort for the attribute data item based at least in part on the associated primary data group for the attribute data item, wherein the cohort comprises one or more peer primary data groups of the plurality of primary data groups for the attribute data item; execute the at least one SQL procedure within the database environment to generate a statistical data value for each attribute of interest of the one or more attributes of interest with respect to the cohort for the attribute data item, wherein at least one SQL procedure is configured to generate each statistical data value based at least in part on each standardized data value for one or more of the one or more peer primary data groups for the attribute data item; and execute the at least one SQL procedure within the database environment to generate the comparison data value for each attribute of interest of the one or more attributes of interest for with respect to the attribute data item, wherein the comparison data value represents a comparison between the standardized data value generated for the attribute of interest for the attribute data item and the statistical data value generated for the attribute of interest with respect to the cohort for the attribute data item; and provide a user interface for displaying via a user computing entity, wherein the user interface comprises, for each attribute data item of one or more of the plurality of attribute data items for an aggregate data group of the plurality of aggregate data groups, (i) the attribute data item identifier and (ii) the comparison data value for each attribute of interest of the one or more attributes of interest for each attribute data item.

In particular embodiments, the at least one SQL procedure is configured to generate the standardized data value for each attribute of interest of the one or more attributes of interest with respect to the attribute data item based at least in part on a selected primary group data value, and (ii) the selected primary group data value is selected from at least one standardized reference table hosted within the database environment based at least in part on the associated primary data group for the attribute data item. In addition, in particular embodiments, the one or more peer primary data groups comprise a proper subset of the plurality of primary data groups that are deemed similar to the associated primary data group for the attribute data item, and (ii) the at least one SQL procedure is configured to identify the cohort by selecting the cohort from at least one cohort reference table hosted within the database environment based at least in part on the associated primary data group for the attribute data item.

Further, in particular embodiments, for each attribute data item of the plurality of attribute data items, the at least one SQL procedure is executed within the database environment to generate a significance data value for each attribute of interest of the one or more attributes of interest. In these particular embodiments, the significance data value for an attribute of interest may identify an estimated magnitude of difference between the standardized data value generated for the attribute of interest for the attribute data item and the statistical data value generated for the attribute of interest for the attribute data item for the cohort. Accordingly, in some embodiments, the user interface may display a user interface element for each attribute of interest in which the significance data value for the attribute of interest comprises a certain data value. For instance, the user interface element may comprise a particular color for the attribute of interest indicating the significance data value and/or a graphical representation for the attribute of interest indicating the significant data value.

Furthermore, in particular embodiments, for each attribute data item of the plurality of attribute data items, the at least one SQL procedure is executed within the database environment to generate a ranking for each attribute of interest of the one or more attributes of interest with respect to the attribute data item. In these particular embodiments, the ranking may comprise two or more peer primary data groups associated with the cohort listed in an order based at least in part on the standardized data value for the attribute of interest for the attribute data item for each of the two or more peer primary data groups associated with the cohort. Accordingly, in some embodiments, the user interface may display the ranking for each attribute of interest of the one or more attributes of interest for a particular attribute data item in response to receiving a selection of the attribute data item identifier for the particular attribute data item by a user via a user interface.

Similarly, in particular embodiments, for each attribute data item of the plurality of attribute data items, the at least one SQL procedure is executed within the database environment to generate a population ranking for each attribute of interest of the one or more attributes of interest with respect to the attribute data item. In these particular embodiments, the population ranking for an attribute of interest with respect to an attribute data item may describe an ordering of each primary data group in the plurality of primary data groups that is determined based at least in part on the standardized data value for the attribute of interest for the attribute data item for each primary data group of the plurality of primary data groups. Accordingly, in some embodiments, the user interface may display the population ranking for each attribute of interest of the one or more attributes of interest for the particular attribute data item in response to receiving a selection of the attribute data item identifier for the particular attribute data item by the user via a user interface. In addition, the user interface may display one or more peer primary data groups associated with the cohort in the population ranking for each attribute of interest.

In some embodiments, the user interface may include the comparison data value for each attribute of interest of the one or more attributes of interest for each attribute data item of the plurality of attribute data items for the aggregate data group, the ranking for each attribute of interest of the one or more attributes of interest for the particular attribute data item, and the population ranking for each attribute of interest of the one or more attributes of interest for the particular attribute data item on non-overlapping portions of the user interface. In addition, in some embodiments, the user interface may include each standardized data value as a selectable user interface element for an attribute of interest of the one or more attributes of interest for each attribute data item of the plurality of attribute data items for the aggregate data group and the user interface may display the aggregate data value for a particular attribute of interest of the one or more attributes of interest for a particular attribute data item in response to receiving a selection of the selectable user interface element for the standardized data value for the particular attribute of interest by a user via the user interface.

As discussed further herein, in some embodiments, each primary data group may describe a clinical commissioning group and each aggregate data group may describe a group of medical conditions. Here, each attribute data item may be an individual medical condition associated with the group of medical conditions described by the associated aggregate data group, and the one or more attributes of interest for an attribute data item may include a cost associated with the individual medical condition with respect to the clinical commissioning group that is associated with the attribute data item and a number of patient activities associated with the individual medical condition with respect to the clinical commissioning group that is associated with the attribute data item.

BRIEF DESCRIPTION OF THE SEVERAL VIEWS OF THE DRAWING(S)

Figure 2:
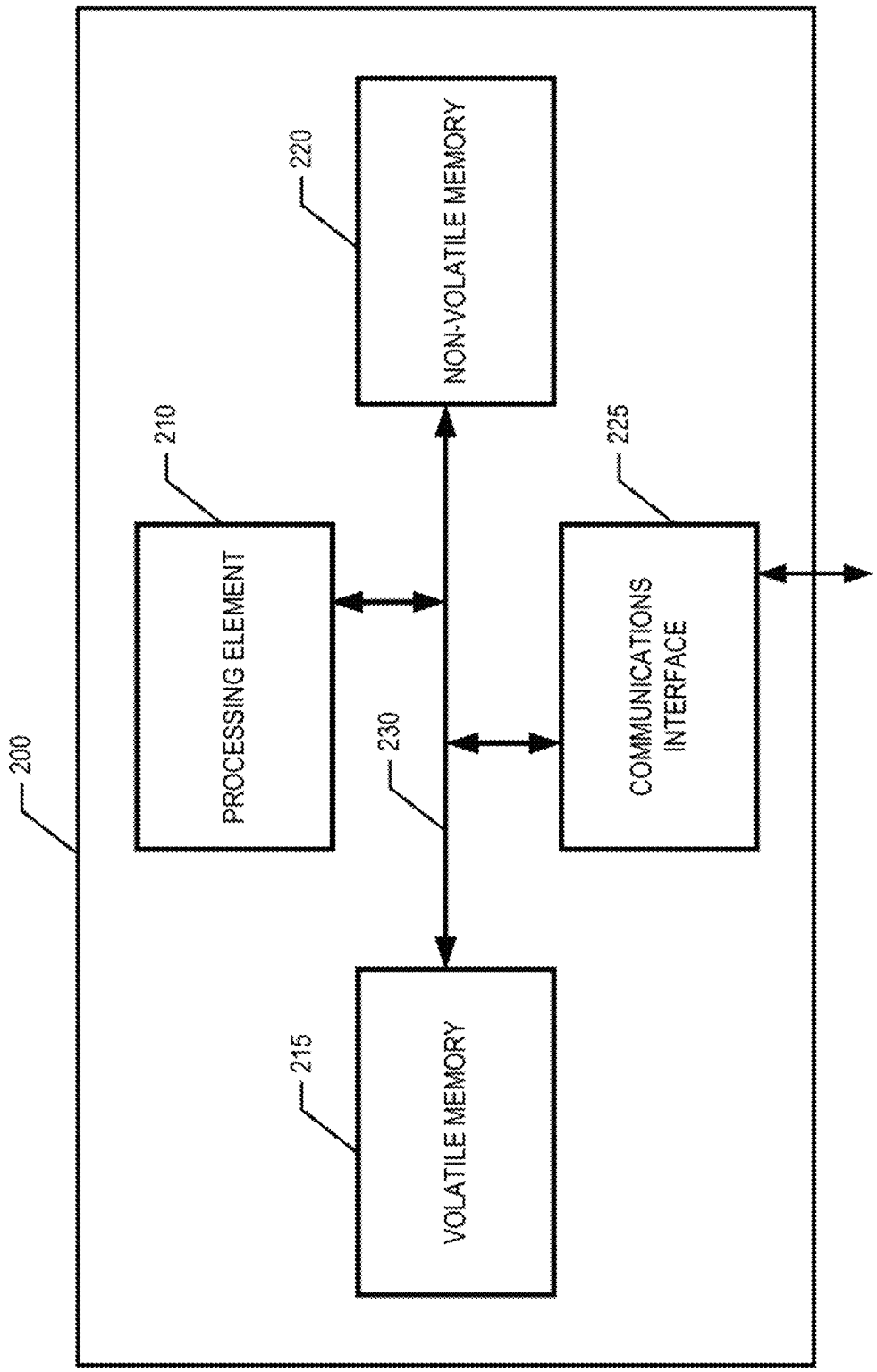
Figure 3:
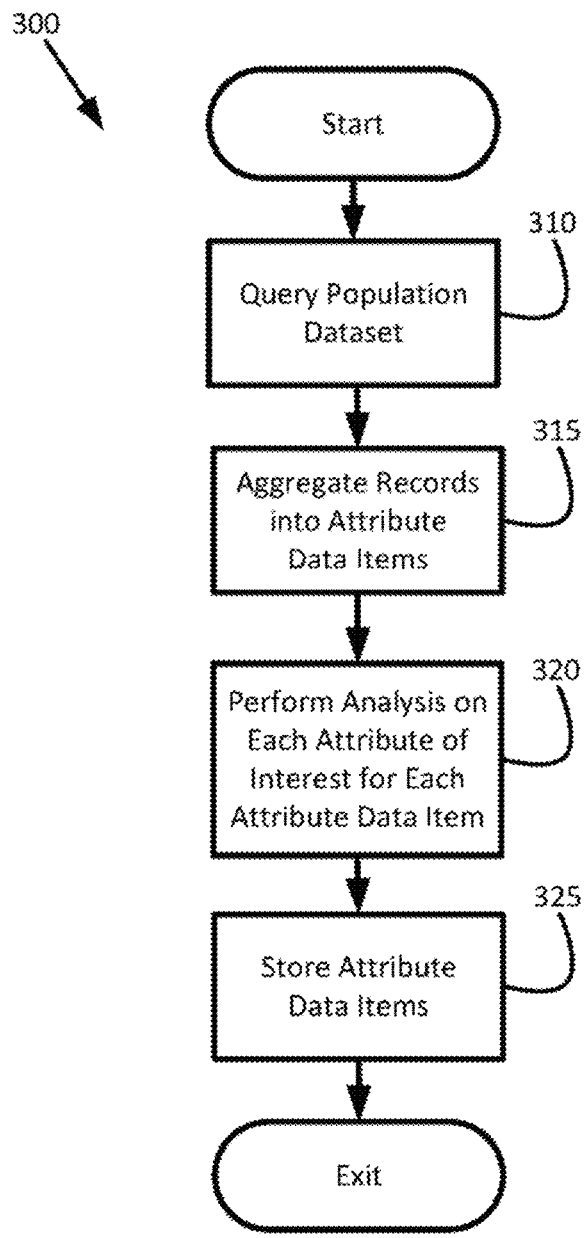
Figure 4:
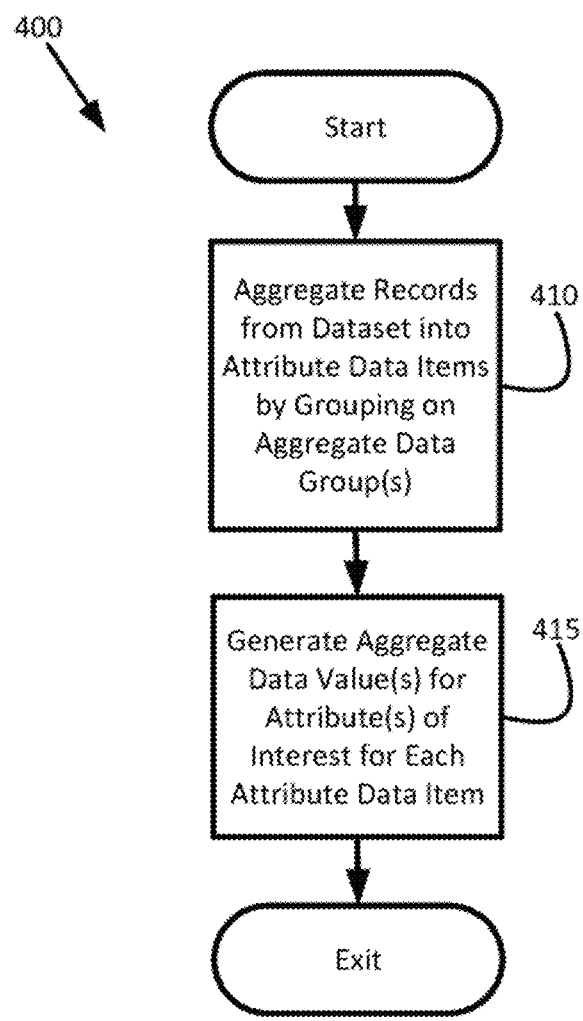
Figure 5:
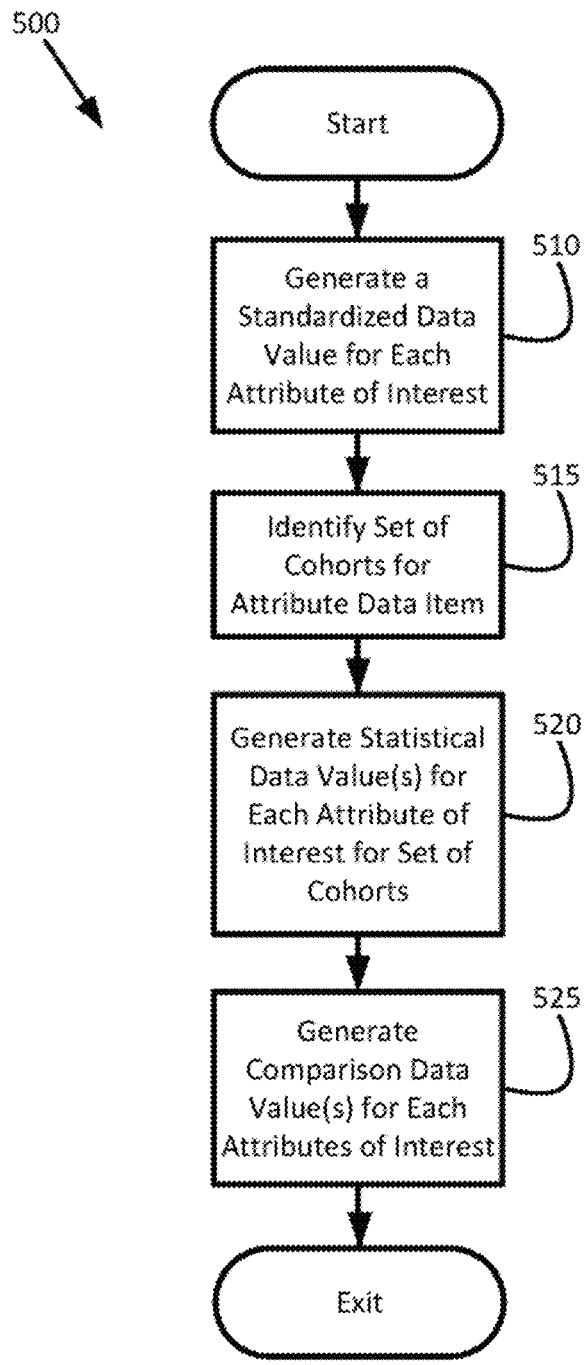

Having thus described the disclosure in general terms, reference will now be made to the accompanying drawings, which are not necessarily drawn to scale, and wherein:

FIG. 1 provides a diagram of a system architecture that can be used in conjunction with various embodiments of the present disclosure;

FIG. 2 provides a schematic of a computing entity that can be used in accordance with various embodiments of the present disclosure;

FIG. 3 provides a process flow for processing a dataset in accordance with various embodiments of the present disclosure;

FIG. 4 provides a process flow for aggregating records found in a dataset in accordance with various embodiments of the present disclosure;

FIG. 5 provides a process flow for performing an analysis on attribute data items in accordance with various embodiments of the present disclosure; and FIGS. 6-12 provide examples of various user interfaces displaying content data generated in accordance with various embodiments of the present disclosure.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

General Overview and Exemplary Technical Contributions

Various embodiments of the present invention relate to innovative and technologically advantage techniques for enabling efficient data comparisons across data entity cohorts using data retrieval operations that are configured to first aggregate data on group levels and then perform comparative data analysis operations on the aggregated data. The noted techniques are in part designed to address technical problems associated with cohort-wise data comparison in big data environments. The noted technical problems arise in circumstances where a large amount of input data is used to perform a large number of comparisons across a large number of inferred entity cohorts. A naïve approach to this problem would be computationally expensive; for instance, given m cohorts and n attributes of interest, the order of data retrieval operations (e.g., relational select operations) may be in an order of m*n. Because of this, there is a technical need for computationally solutions that enable efficient data comparisons across data entity cohorts.

To address the above-described technical need, various embodiments of the present invention disclose using relational database operations (e.g., Structured Query Language (SQL) procedures) that first aggregate data on group levels and then perform comparative data analysis operations on the aggregated data. For example, in some embodiments, SQL procedures are configured to generate attribute data items that describe attributes of interests for associated primary data groups. The generated attribute data items are then processed to generate standardized data values, statistical data values, and cohorts. By using the described techniques, various embodiments of the present invention limit the number of data retrieval operations performed in order to enable efficient data comparisons across data entity cohorts using data retrieval operations, as these embodiments perform data retrieval at the beginning of the multi-stage data comparison process through aggregating data on group levels.

By reducing the number of data retrieval operations performed in order to enable efficient data comparisons across data entity cohorts using data retrieval operations, the noted embodiments of the present invention enable performing data comparisons across data entity cohorts with lower computational complexity relative to conventional solutions, a feature that has special advantages in cases of processing big data sources in order to perform cross-cohort data comparisons. This in turn means that various embodiments of the present disclosure increase the computational efficiency of performing data comparisons across data entity cohorts and make important technical contributions to the field of big data analysis.

Another technical advantage of various embodiments of the present invention relates to enabling statistical modeling operations using relational database operations, such as using SQL operations. The inventor of the present disclosure has confirmed that, to the best of the inventor's knowledge, there does not currently exist solutions that enable performing statistical modeling operations using relational database operations alone. To address this problem, various embodiments of the present disclosure incorporate statistical modeling data for various probability distributions using relational tables, and use relational database operations (such as select operations) to retrieve such statistical modeling data and use the retrieved statistical modeling data to perform comparative data analysis operations. For example, in some embodiments, a comparative data analysis system incorporates critical values characterizing a Chi-square distribution into a look-up table and uses the look-up table to generate statistical modeling inferences based on the Chi-square distribution. As another example, in some embodiments, a comparative data analysis system incorporates z-scores characterizing a Gaussian distribution into a look-up table and uses the look-up table to generate statistical modeling inferences based on the Gaussian distribution.

One resulting technical effect of enabling statistical modeling operations using relational database operations is increasing the computational efficiency of performing statistical operations in relational database environments. Absent using the techniques introduced herein, a comparative data analysis system interacting with a relational database likely needs to use an outside programming language library to incorporate statistical modeling relationships. This in turn requires execution of operations needed to compatibly integrate the relational database operations and the external programming language operations. By avoiding the need for execution of such cross-framework compatibility operations via enabling statistical modeling operations using relational database operations, various embodiments of the present invention further increase the computational efficiency of performing data comparisons across data entity cohorts and make additional important technical contributions to the field of big data analysis.

An exemplary technical application of various embodiments of the present invention in the healthcare data processing context is described below. In England, the National Health Service (NHS) produces National Commissioning for Value (CfV) packs for clinical commissioning groups (CCGs) and general practices (GPs) that can be used in identifying the best opportunities to increase value and improve outcomes. Accordingly, CfV packs can help CCGs and GPs set priorities which offer the best opportunities for improving the value that patients receive from their healthcare and improving the value that populations receive from investment in their local health system. For instance, the insights provided in CfV packs can support local discussion about prioritization and utilization of resources. More specifically, CfV packs can help local leaders to improve healthcare quality, outcomes, and efficiency by recommending opportunities about where to look to help CCGs and/or GPs deliver value to their populations and/or patients. In general, CfV packs aim to identify local opportunities for improvement in health outcomes, patient experience, and/or finance. In addition, these packs aim to access, analyze, and understand relevant clinical data, as well as benchmark a CCG's and/or health communities outcomes against similar populations elsewhere.

A significant problem related to producing CfV packs is the vast amount of resources used in producing them. NHS has produced the CfV packs to highlight the clinical variation across England for several years, and although the output is available to all users, the process of production and timeliness is limited. For example, it has been acknowledged by pack users that the information provided in the packs is not easily understandable and difficult to obtain due to the number of PDF pages provided in the packs. The packs are currently produced using Microsoft Excel and are large in size often exceeding 350 MB. This can make them prone to corruption, file irregularities, and failing formulas within. Furthermore, the number of Excel files used for the CfV packs can be more than fifty and are inter-dependent on one another. All of this results makes generating the packs excessively time consuming and the relevancy of the information provided in the packs often outdated.

The CfV packs are refreshed annually around November of each year and utilize Hospitals Episodes Statistics (HES) and ePACT Prescribing data from the previous financial year. Therefore, the CfV packs can be viewed as out of date and do not provide an updated position during the current financial year. In addition, CfV packs are produced for each CCG and GP in England, and this is amplified by the fact one pack is generated per medical condition category (RightCare condition), of which there are nine. Accordingly, nine condition packs per CCG, averaging one-hundred pages per pack, can result in one-hundred and seventy-one thousand pages of PDF information, and nine condition packs per GP, averaging one-hundred pages per pack, can result in seven million pages of PDF information. Each of the nine condition packs must be downloaded individually per CCG and GP. Thus, CCGs and GPs oftentimes disengage from CfV pack usage due to the sheer number of pages and the lack of intuitive structure of the packs.

Accordingly, various embodiments of the disclosure provided herein are configured to address the issues described above with respect to the CfV packs. An example involving the information provided in the CfV packs is used throughout the remainder of the disclosure to demonstrate various embodiments and to assist in the reader's understanding of these embodiments. However, with that said, various embodiments of the disclosure can be used in other situations involving large volumes of data to determine benchmarks and identify variations found within the data. Therefore, the use of the CfV example throughout the disclosure should not be construed to limit the scope of the disclosure.

Various embodiments of the present disclosure overcome many of the challenges noted above by providing methods, apparatus, systems, computing devices, computing entities, and/or the like for efficiently and timely condensing large volumes of data into summarized information to facilitate benchmarking and identifying of variations found within the data. Accordingly, various embodiments enable comparisons to be carried out with respect to different attributes of interest between members found in peer groups (referred to herein as cohorts). As further described herein, these comparisons may be used in some instances in identifying opportunities for peer members with respect to the different attributes of interest.

As a result, various embodiments provide for automated identification of opportunities found within large datasets that would oftentimes be undetectable due to the sheer volume of information found in these datasets. In addition to identify such opportunities, some embodiments also provide for automated identification of the significance of the opportunities. Further, various embodiments enable efficient processing of large datasets that allow for routine and more timely refreshes of summaries produced from such datasets. In many instances, such efficient processing can also reduce the amount of resources (e.g., computing capacity) needed to condense these large datasets into summarized information. Furthermore, particular embodiments enable users to view the summarized information, benchmarking, variations, opportunities, and/or the like through one or more intuitive user interfaces allowing quick interaction at differing levels of the information that would not normally be available under conventional systems and processes.

Therefore, the disclosed solutions provided herein are more effective, efficient, timely, accurate, and faster in condensing large volumes of data than conventional practices, systems, and infrastructures used in many industries today. In addition, the disclosed solutions provided herein can facilitate the benchmarking and identifying of variations present within these large volumes of data, as well as facilitate comparisons to be carried out among members of a cohort, in a manner that could not be carried out using conventional practices, systems, and infrastructures. Further, various embodiments of the disclosed solution can carry out data processing in a manner that cannot be feasibly performed by a human, especially when such data processing involves large volumes of data, as is typical in many big data contexts. This is especially advantageous when data processing must be carried out over a reasonable timeframe to allow for relevant observations to be gathered from the data. In doing so, various embodiments of the present disclosure make major technical contributions to improving the computational efficiency and reliability of processing large volumes of data. This in turn translates to more computationally efficient software systems, such as more computationally efficient database management systems.

DEFINITIONS OF CERTAIN TERMS

The term "attribute of interest" may refer to a data object representing a characteristic assigned, associated, acquired, and/or the like for a subject, entity, article, item, record, category, occurrence, etc. that is of interest for carrying out a statistical analysis in various embodiments. For instance, an attribute of interest may be a quality, quantity, property, trait, and/or the like assigned, associated, and/or acquired by a subject, entity, article, item, record, category, occurrence, etc. For example, as described further herein, one or more attributes of interest on which a statistical analysis is carried out in particular embodiments is costs and patient activities associated with different medical conditions over a particular time period.

The term "primary data group" may refer to a data object that describes a subject, entity, article, item, record, category, occurrence, etc. for which one or more attributes of interest exist. In various embodiments, a statistical analysis is carried out on the attributes of interest to facilitate performing a comparison of the attributes among different primary data groups. For instance, in particular embodiments, the primary data group is a clinical commissioning group (CCG) on which one or more automated statistical analysis procedures are based on costs and patient activities associated with the CGG in relation to various medical conditions, e.g., to facilitate performing a comparison of the costs and patient activities for the various medical conditions encountered among different CCGs.

The term "cohort" may refer to a data object that describes a group of subjects, entities, articles, items, records, categories, occurrences, etc. (e.g., members) sharing one or more similarities (e.g., characteristics) that make the group conducive to performing a statistical analysis on the group so that a meaningful comparison can be carried out among the members of the group. Accordingly, in particular embodiments, a cohort includes two or more primary data groups (e.g., two or more CCGs) having similarities so that a meaningful comparison of one or more attributes of interest for the primary data groups can be carried out among the primary data groups found in the cohort.

The term "population dataset" may refer to a data object having a set of data records containing information on various attributes of interest for a plurality of primary data groups. Typically, the population dataset includes data records for a particular period of time. As discussed below, an example population dataset may include data from one or more of the following data sources: a National Hospital Episodes Statistics (HES) dataset, an electronic prescribing analysis and cost tool (ePACT) dataset, quality and outcomes framework (QOF) datasets, and/or the like.

The term "aggregate data group" may refer to a data object describing a subject, entity, article, item, record, category, occurrence, etc. on which values for one or more attributes of interest may be aggregated based on a grouping of the subject, entity, article, item, record, category, occurrence, etc. Depending on the embodiment, the one or more attributes of interest may be aggregated by grouping based on a single aggregate data group or multiple aggregate data groups. For example, in some embodiments, the one or more attributes of interest may be aggregated by grouping on a single aggregate data group that includes different categories of medical conditions. While in other embodiments, the one or more attributes of interest may be aggregated by grouping on multiple aggregate data groups that include, for example, categories of medical conditions, gender, admissions processes to a medical facility, patient age groups, and/or the like. As noted below, in some embodiments, different attribute data items are determined based on an aggregate module grouping data records according to one or more aggregate data groups. As described further herein, such grouping may allow for analysis to be performed on the data with respect to the different aggregate data groups. For example, an aggregate module may be configured to group the data queried from the HES dataset into attribute data items based on one or more of CCG, GP, admissions process (e.g., day cases, emergency cases, non-emergency cases, elective cases, and/or the like), medical condition category, diagnosis category, gender, age group (e.g., person over 75, child, adult, and/or the like), and/or the like. As discussed further herein, grouping the attribute data items based on the different aggregate data groups can allow for analysis to be carried out on different granular levels in various embodiments. In addition, such grouping can allow for viewing on the data with respect to these different granular levels in various embodiments.

The term "attribute data item" may refer to a data object describing aggregate data for one or more attributes of interest. In various embodiments, attribute data items may be produced by aggregating data from records found in a dataset with respect to one or more aggregate data groups. In some embodiments, an attribute data item may be associated with an attribute data item identifier that can be used in displaying data values for one or more attributes of interest of the primary data groups found in the primary data group's cohort on, for example, a user interface to demonstrate the attributes are related to the attribute data item. In some embodiments, an aggregate module aggregates the data into the attribute data items by grouping the data based on one or more aggregate data groups. Accordingly, an attribute data item represents a grouping on the queried data (e.g., a group of the queried data records) based on the one or more aggregate data groups.

The term "aggregate data value" may refer to a data object describing aggregation of values for an attribute of interest found in an attribute data item. Accordingly, in various embodiments, the aggregation of values may be performed with respect to one or more aggregate data groups to form the attribute data item. In some embodiments, an aggregate module may generate aggregate data values for one or more attributes found in the queried data for each attribute data item. For example, each of the attribute data items may include an aggregate data value for costs incurred for patients who experienced a medical condition such as a hernia and/or the number of activities for a medical condition such as the number of occurrences involving patients experiencing a hernia. Here, these two attributes may be considered attributes of interest in that further analysis is to be carried out on the attributes to provide information of interest that is inferred from the data.

The term "standardized data value" may refer to a data object describing a value determined for an attribute of interest based on the aggregate data value for the attribute of interest. In particular embodiments, the standardized data value represents a value that has been standardized so that the value may then be used in a statistical analysis involving comparing the attribute of interest between different primary data groups. In some embodiments, an aggregate module may be configured in particular embodiments to generate a standardized data value for the aggregate data value of an attribute of interest to standardize the aggregate data value based on some measure or characteristic for the CCGs. In some embodiments, this standardized data value may then be used in determining the comparison data value so that the comparison data value may represent a more meaningful benchmark measurement of the CCG's performance. In some embodiments, to generate a standardized data value for an attribute data item, an aggregate module initially generates a primary group data value for the primary data group that is associated with the attribute data item. For instance, in the example, the aggregate module may generate a direct age and sex standardized rate (DASR) for each CCG as the primary group data value for each CGG. The aggregate module may then use the DASR for the different groupings to standardize the attributes of interest for the attribute data item.

The term "primary group data value" may refer to a value used in determining the standardized data value for an attribute of interest. In particular embodiments, the primary group data value may be selected from "a standardized reference table" based on the primary data group associated with an attribute data item containing the attribute of interest. In some embodiments, to generate a standardized data value for an attribute data item, an aggregate module initially generates a primary group data value for the primary data group that is associated with the attribute data item. For instance, in the example, the aggregate module may generate a direct age and sex standardized rate (DASR) for each CCG as the primary group data value for each CGG. Here, the DASR for each CCG may be determined based on groupings found within each of the CCGs such as gender and age groups. In addition, the DASR may be based on some feature that is common across all of the CCGs such as a population count feature. Thus, for example, the aggregate module may determine the DASR for a CCG as the European population for a particular group (e.g., females) divided by the population for the particular group found in the CCG (e.g., European female population/female population in the CCG). Accordingly, in particular embodiments, the aggregate module may make use of one or more standardized reference tables for identifying the populations found in the different CCGs and/or Europe for the different genders and age groups.

The term "statistical data value" may refer to a data object that describes a value determined for an attribute of interest in an attribute data item with respect to one or more members of a cohort. In various embodiments, a comparison may be carried out of the standardized data value for an attribute of interest in an attribute data item related to a particular primary data group with the statistical data value for the attribute of interest related to one or more peer primary data groups of a cohort for the particular primary data group. In particular embodiments, the statistical data value may be based on the standardized data values generated for one or more of the primary data groups found in the cohort for the attribute of interest. For instance, with respect to the HES dataset, an aggregate module may generate a statistical data value for both cost and activity for the medical condition associated with the attribute data item based on the standardized cost and activity values generated for each of the top five CCGs found in the cohort. Here, the aggregate module may sum the standardized values for cost for each of the top five CCG performers found in the cohort for the medical condition and take the average, mean, median, and/or the like of the sum to arrive at the statistical data value for cost. The aggregate module may do the same for the activity.

The term "comparison data value" may refer to a data object that describes a value generated as an output in various embodiments from performing a comparison of the standardized data value for an attribute of interest in an attribute data item related to a particular primary data group with the statistical data value for the attribute of interest related to one or more members of a cohort for the particular primary data group. For instance, in particular embodiments, the comparison data value may represent a quantifiable measurement of a difference between the standardized data value and the statistical data value for the attribute of interest. With respect to the HES dataset, an aggregate module may be configured to generate one or more comparison data values for the standardized cost for the medical condition associated with the attribute data item. For example, the aggregate module may calculate the comparison data value when the standardized cost is greater than the statistical cost as ((standardized cost−statistical cost for the top five performers found in the cohort)/100,000)*the population of the CCG associated with the attribute data item. Here, in this example, the calculation involves multiplying the difference between the standardized cost and the statistical cost by the population of the CCG to generate an actual cost value with respect to the medical condition in light of the standardized values. Accordingly, the aggregate module may perform the calculation ((standardized activity−statistical activity for the top five performers found in the cohort)/100,000)*the population of the CCG associated with the attribute data item to generate a comparison data value for standardized activity for the medical condition. Further, in some embodiments, the aggregate module may be configured to generate comparison data values for each of the attributes of interest for different numbers of primary data groups and/or different groupings found with the primary data groups.

The term "significance data value" may refer to a data object describing a value identifying an estimated magnitude of difference of a primary data group for an attribute data item and one or more primary data groups found in the primary data group's cohort as inferred based on a comparison performed between the primary data group and the one or more primary data groups found in the primary data group's cohort. In some embodiments, a significance data value may identify an opportunity for addressing the attribute of interest for the attribute data item related to the particular primary data group. For example, an attribute of interest may be costs incurred by a particular CCG for a particular medical condition. Here, the significance data value determined for the standardized costs incurred by the particular CCG for the medical condition with respect to the average costs incurred by the CCG's peers (e.g., other CCGs found in a related cohort) for the same medical condition may identify an opportunity for improving that has a significant impact on the CCG's performance.

The term "ranking" for an attribute of interest may refer to an ordering of two or more primary data groups found in a cohort with respect to standardized data values determined for the primary data groups for the particular attribute of interest. For example, in some embodiments, a ranking of two or more CCGs found in a cohort may be provided with respect to patient activities encountered for a particular medical condition, where the ranking that orders the CCGs based on the standardized data value determined for patient activities for each of the two or more CCGs found in the cohort. In addition, in some embodiments, a "population ranking" may be provided for representing all of the primary data groups (e.g., all of the CCGs) across all cohorts. In particular embodiments, one or more of the primary data groups found in a cohort of a particular target primary data group may be highlighted in the population ranking.

The term "user interface" may refer to one or more electronic pages (e.g., webpages), screens, windows, graphical user interfaces, and/or the like viewable by a user via a display (e.g., browser) executing on a user computing entity as described further herein. For convenience, the term "user interface" is used throughout the remainder of the application, although those of ordinary skill in the art understand this term may include other forms of displaying content data. In some embodiments, user interface includes user interface data comprising an encoding of a displayable electronic interface, such as Hypertext Markup Language (HTML) data for a displayable electronic interface.

Accordingly, in various embodiments, content data (e.g., identifier(s), data value(s), format(s), and/of the like) may be displayed on a user interface and may be associated with various functionalities. In particular embodiments, a user interface may include multiple "sections." These sections may be used to display different segments of content data in addition, in some embodiments, content data may be displayed as selectable to invoke additional content data being displayed. For example, one or more data values may be provided as selectable user interface elements and/or provided with one or more user interface elements as selection mechanisms, such as buttons, that a user may select to view and/or filter additional content data. Depending of the embodiment, the additional content data may then be provided and/or filtered for displaying on another section on the user interface (e.g., on a second section) and/or via a separate user interface.

Depending on the embodiment, a user interface may be configured to include any number of sections provided in various layouts. For instance, the sections may be provided side-by-side on non-overlapping potions of the user interface or may be provided as overlapping (e.g., superimposed over one another) on the user interface. In addition, the sections may be displayed in various sizes and dimensions with respect to the user interface. Further, the sections may be displayed statically and/or dynamically such as pop-up windows.

Computer Program Products, Systems, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 1 illustrates a system architecture 100 that may be used in accordance with the various technologies and concepts disclosed herein. Here, one or more user devices 110a, 110b, 110c are communicating over a network 115 with a server 120 providing access to summarized and/or analyzed data such as, for example, the data found in CfV packs as previously described. Depending on the embodiment, the network 115 may include one or more of a cellular network, Internet, intranet, Local Area Network, Wide Area Network, or any other form of connecting two or more systems, components, or storage devices together. Further, depending on the embodiment, the user devices 110a, 110b, 110c may be servers, personal computers, laptop computers, tablet devices, smartphones, and/or the like.

In particular embodiments, the server 120 may be configured for providing access to the summarized and/or analyzed data as content data via a website, software as a service, in a server/client capacity via a client application, and/or the like to the user devices 110a, 110b, 110c. Accordingly, the server 120 may run any variety of server or mid-tier applications, including Hypertext Transfer Protocol ("HTTP") servers, File Transfer Protocol ("FTP") servers, Computer-Generated Imagery ("CGI") servers, data servers, Java servers, business application servers, and/or the like. For example, users may visit a website to gain access to the content data. In this example, the server 120 may provide the website by executing one or more programs and/or scripts such as one or more Web applications that may be implemented as one or more scripts and/or programs written in an appropriate programing language such as, for example, Java, C, C#, or C++, or scripting language such as, for example, Perl, Python, or TCL.

The system architecture 100 shown in FIG. 1 also includes a data store 125. Although only a single data store 125 is shown, it should be understood that several data stores, layers, and/or other components may be involved, which may be chained or otherwise configured to interact. Specifically, the data store 125 may be a device or any combination of devices capable of storing, accessing, manipulating, and/or retrieving data. For instance, depending on the embodiment, the data store 125 may include any combination and number of data servers 130 and data storage media 135 in any standard, distributed, or clustered configuration. For example, the data storage media 135 may include one or more devices such as hard disks arranged in a Redundant Array of Independent Disks (RAID) array, a tape storage drive including a magnetic tape data storage device, an optical storage device, and/or the like.

In addition, the data stored within the data store 125 may be arranged in one or more databases and stored, processed, and/or accessible through Structured Query Language (SQL) and/or other database query languages or operations. Accordingly, the data server(s) 130 may be configured to access and retrieve data (e.g., datasets) from remote data sources, process the data, and store the results of processing the data as content data within the data store 125. Furthermore, the data store 125 may be configured to provide accessible to the content data to the user devices 110a, 110b, 110c via the server 120 in an appropriate structured language such as, for example, Hypertext Markup Language ("HTML"), eXtensible Markup Language ("XML"), and/or the like.

Exemplary Computing Entity

FIG. 2 provides a schematic of a computing entity 200 according to various embodiments of the present invention. For instance, the computing entity 200 may be a server 120, a data server 130, and/or a user device 110a, 110b, 110c found within the system architecture 100 previously described in FIG. 1. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 200 shown in FIG. 2 may be embodied as a plurality of computing entities, tools, and/or the like operating collectively to perform one or more processes, methods, and/or steps. As just one non-limiting example, the computing entity 200 may comprise a plurality of individual data tools, each of which may perform specified tasks and/or processes.

Depending on the embodiment, the computing entity 200 may include one or more network and/or a communications interface 225 for communicating with various computing entities, such as by communicating data, content, information, and/or similar terms used herein interchangeably that can be transmitted, received, operated on, processed, displayed, stored, and/or the like. Thus, in certain embodiments, the computing entity 200 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 200 includes or is in communication with a processing element 210 (also referred to as processors, processing circuitry, and/or similar terms used herein interchangeably) that communicate with other elements within the computing entity 200 via a bus 230, for example, or network connection. As will be understood, the processing element 210 may be embodied in several different ways. For example, the processing element 210 may be embodied as one or more complex programmable logic devices (CPLDs), microprocessors, multi-core processors, coprocessing entities, application-specific instruction-set processors (ASIPs), and/or controllers. Further, the processing element 210 may be embodied as one or more other processing devices or circuitry. The term circuitry may refer to an entirely hardware embodiment or a combination of hardware and computer program products. Thus, the processing element 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 210 may be configured for a particular use or configured to execute instructions stored in volatile or non-volatile media or otherwise accessible to the processing element 210. As such, whether configured by hardware, computer program products, or a combination thereof, the processing element 210 may be capable of performing steps or operations according to embodiments of the present invention when configured accordingly.

In various embodiments, the computing entity 200 may include or be in communication with non-volatile media (also referred to as non-volatile storage, memory, memory storage, memory circuitry and/or similar terms used herein interchangeably). For instance, the non-volatile storage or memory may include a non-volatile memory 220 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile memory 220 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the non-volatile memory 220 may also be embodied as a data storage device or devices, as a separate database server or servers, or as a combination of data storage devices and separate database servers. Further, in some embodiments, the non-volatile memory 220 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the invention may be stored.

In various embodiments, the computing entity 200 may further include or be in communication with volatile media (also referred to as volatile storage, memory, memory storage, memory circuitry and/or similar terms used herein interchangeably). For instance, the volatile memory may also include a volatile memory 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile memory 215 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 210. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 200 with the assistance of the processing element 210 and operating system.

Although not shown, the computing entity 200 may include or be in communication with one or more input elements, such as a keyboard input, a mouse input, a touch screen/display input, motion input, movement input, audio input, pointing device input, joystick input, keypad input, and/or the like. The computing entity 200 may also include or be in communication with one or more output elements (not shown), such as audio output, video output, screen/display/interface output, motion output, movement output, and/or the like.

As will be appreciated, one or more of the computing entity's components may be located remotely from other computing entity components, such as in a distributed system. Furthermore, one or more of the components may be aggregated and additional components performing functions described herein may be included in the computing entity 200. Thus, the computing entity 200 can be adapted to accommodate a variety of needs and circumstances.

Exemplary System Operations

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Accordingly, logical operations are described in the context of modules, although these operations are not limited to a modular structure. Rather, some or all of the operations described in relation to the modules described herein may be implemented in various formats including, but not limited to, a single set of integrated instructions, commands, code, queries, etc. For instance, in particular embodiments, the operations may be implemented in database query instructions, including SQL, PL/SQL, and/or the like. Alternatively, the operations may be implemented in software coded such as C, C++, C#, php, Java, and/or the like. In still other embodiments, the operations may be implemented in web-based instructions such as HTML, XML, and/or the like.

Aggregate Module

Turning now to FIG. 3, additional details are provided regarding a process flow for aggregating data found in a population dataset according to various embodiments. FIG. 3 is a flow diagram showing an aggregate module for performing such functionality according to various embodiments of the disclosure. For example, the flow diagram shown in FIG. 3 may correspond to operations carried out by a processing element 210 in one or more computing entities 200 as it executes the aggregate module stored in the computing entities' volatile and/or nonvolatile memory.

Here, the process flow 300 shown in FIG. 3 will be described with respect to the example of aggregating data (e.g. records) from a population dataset used in producing CfV packs. In this instance, the population dataset contains National Hospital Episodes Statistics (HES) data. HES data contains details on all admissions, A and E attendances, and outpatient appointments at NHS hospitals in England over a particular period of time. The data is collected during a patient's time at a hospital as part of the commissioning dataset. However, as explained further herein, the population dataset may include other types of data such as ePACT Prescribing data and Quality and Outcomes Framework data. Accordingly, in particular embodiments, the population dataset may be downloaded securely and stored within one or more databases. In particular embodiments, the database(s) may only be accessed by authorized persons and may contain several lookup reference tables. These lookup reference tables may be used to facilitate mapping of data elements across different datasets. For example, the reference tables may be used to enable cross-dataset mapping of data elements such as CCG names, GP names, date fields, sustainability and transformation project names, medical condition groups, diagnosis code names, population sizes for different entities such as Europe, CCGs, and/or GPs, Chi-square statistics, normalized statistics, inverse normalized statistics, quality outcome framework threshold table(s), CCG peer lookup table(s), GP cluster lookup table(s), and/or the like.

In particular embodiments, the aggregate module may constitute one or more stored units (e.g., procedures, functions, packages, scripts, and/or the like) within a database environment that are each configured to run within Structured-Query Language (SQL) routines to collate the population dataset to an aggregated level to, in some instances, remove any patient identifiability and to reduce the vast amount of information found in the dataset. The term "procedure" may be used herein, although this term may be used to represent other units such as functions, packages, scripts, and/or the like. In some embodiments, the aggregate module may be used to mine and extract the data from the population dataset at a bespoke level solely within the database environment that holds the dataset and reference tables. Accordingly, such a configuration may result in more efficiency in processing the data in some instances than seen in conventional processes and/or systems used in mining and extracting data from large datasets.

However, with that said, not all embodiments of the aggregate module may involve SQL units that are run solely within a database environment, but instead may involve other configurations and implementations. For example, in particular embodiments, the aggregate module may involve one or more Procedural Language for SQL (PL/SQL) units that are utilized by applications outside the database environment such as, for example, by applications Java instructions and/or and Pro*C instructions.

The process flow 300 begins in various embodiments with the aggregate module querying the data (e.g., different data records) from the population dataset in Operation 310. Here, the aggregate module is configured in particular embodiments to query the dataset to gather different attributes (e.g., data fields) from the data records found in the population dataset that may be of interest in performing further mining, aggregation, analysis, and/or the like on the different attributes. For instance, in the example involving the aggregate module processing the HES dataset, the aggregate module may be configured to query attributes for the different records such as CCG, GP, gender, age, admissions process, medical condition group, medical condition, medical diagnosis group, medical diagnosis, medical procedure, cost, activity, and/or the like. In addition, in some embodiments, the aggregate module may make use of one or more reference tables to standardize certain attributes and/or to identify certain attributes for the records. For example, the aggregate module may make use of one or more references tables to standardize names of entities such as CCGs and/or GPs. In addition, the aggregate module may make use of one or more references tables to identify attributes such as a medical condition category attribute and/or a diagnosis category attribute.

Once the aggregate module has queried the data from the population dataset, the aggregate module aggregates the data into attribute data items in Operation 315. Turning briefly to FIG. 4, a process flow 400 is shown that may be executed by the aggregate module in aggregating the data in the attribute data items. Here, the aggregate module aggregates the data into the attribute data items by grouping the data based on one or more aggregate data groups in Operation 410. Accordingly, an attribute data item represents a grouping on the queried data (e.g., a group of the queried data records) based on the one or more aggregate data groups. In particular embodiments, each attribute data item may include an attribute data item identifier representing the attribute data item. For example, in the case involving data queried from the HES dataset, the attribute data item identifier may be a medical condition experienced by various patients such as a hernia. In addition, the aggregate module may generate aggregate data values for one or more attributes found in the queried data for each attribute data item in Operation 415. For example, each of the attribute data items may include an aggregate data value for costs incurred involving patients who have experienced a medical condition such as a hernia and/or the number of activities for a medical condition such as the number of occurrences involving patients experiencing a hernia. Here, these two attributes may be considered attributes of interest in that further analysis is to be carried out on the attributes to provide information of interest that is inferred from the data.

As noted, the different attribute data items are based in various embodiments on the aggregate module grouping the data (e.g., data records) according to one or more aggregate data groups. As described further herein, such grouping may allow for analysis to be performed on the data with respect to the different aggregate data groups. For example, the aggregate module may be configured to group the data queried from the HES dataset into attribute data items based on one or more of CCG, GP, admissions process (e.g., day cases, emergency cases, non-emergency cases, elective cases, and/or the like), medical condition category, diagnosis category, gender, age group (e.g., person over 75, child, adult, and/or the like), and/or the like. As discussed further herein, grouping the attribute data items based on the different aggregate data groups can allow for analysis to be carried out on different granular levels in various embodiments. In addition, such grouping can allow for viewing of the data with respect to these different granular levels in various embodiments.

Further, the attribute data items may be based on different levels of information found in the queried data (e.g., different attribute data item identifiers). For example, the attribute data items may be based on attributes different than medical conditions such as medical diagnoses, medical procedures, and/or the like. Aggregating the queried data into attribute data items for different levels may allow for analysis on the items to be carried out with respect to different topics of interest such as medical conditions, diagnoses, and/or procedures. Furthermore, aggregating the queried data into attribute data items for different topics of interest may allow for viewing of information with respect to these different topics of interest.

Returning to FIG. 3, at this point, the aggregate module performs an analysis on each attribute of interest for each attribute data item in Operation 320. Accordingly, the analysis may involve generating various data values for each attribute of interest of an attribute data item. For instance, in particular embodiments, the aggregate module may generate one or more comparison data values for each attribute of interest. A comparison data value for an attribute of interest may be used in various embodiments to represent the output of a comparison performed among primary data groups found within the data. For example, the primary data groups found in the HSE dataset may be the different CCGs and/or GPs. In this example, the comparison data values for the different attributes of interest may represent comparisons carried out among the different CCGs and/or GPs to benchmark the performance of a particular CCG and/or GP among the CCG's and/or GP's peers with respect to the attributes of interest.

For instance, an attribute of interest may describe the costs incurred by the different CCGs for various medical conditions over the particular time period associated with the data found in the HSE dataset. Here, the aggregate module may generate a comparison data value for each of the CGGs that can then be used as a benchmark measurement of any one CCG's performance on cost for a particular medical condition with respect to the other CCGs. As detailed further herein, the aggregate module may be configured in particular embodiments to identify peers of the GGCs, referred to as a cohort, so that the comparison data value may be determined with respect to the cohort (or portion thereof) and, therefore, may represent a more meaningful benchmark measurement of the CCG's performance. In addition, the aggregate module may be configured in particular embodiments to generate a standardized data value for the aggregate data value of an attribute of interest to standardize the aggregate data value based on some measure or characteristic for the CCGs. Accordingly, this standardized data value may then be used in determining the comparison data value so that the comparison data value may represent a more meaningful benchmark measurement of the CCG's performance.

Therefore, in particular embodiments, the aggregate module may generate a comparison data value for the cost incurred by the CCG for the particular medical condition that represents a cost reduction required by the CCG over a particular time period to achieve the average cost incurred by one or more of the CCG's cohorts (e.g., top five performing CCGs in the cohort) for the same medical condition. Here, the comparison data value may represent an opportunity for the CCG to improve the CCG's performance with respect to cost incurred for the medical condition.

Accordingly, in some embodiments, more than one comparison data value may be generated for any one attribute of interest in some instances. For example, a first comparison data value may be generated for the cost incurred by the CCG for the particular medical condition with respect to the top five performing CCGs found in the CCG's cohort and a second comparison data value may be generated with respect to the top ten performing CCGs found in the cohort. In addition, comparison data values may be generated for subcategories found within the primary data groups. For example, comparison data values may be generated for the cost incurred by the CCG for the particular medical condition with respect to age groups found within the CCG. Those of ordinary skill in the art can envision other forms of comparison data values that may be generated in various embodiments in light of this disclosure.

Furthermore, the aggregate module may also be configured in some embodiments to generate one or more significance data values in conjunction with (or instead of) the comparison data value(s). In these particular embodiments, the significance data value(s) may indicate an estimated magnitude of difference as inferred based on a comparison performed between a primary data group and one or more primary data groups found in the primary data group's cohort. For instance, returning to the example involving the HES dataset, the aggregate module may determine a significance data value based on a comparison performed between the CCG's cost incurred for the particular medical condition over the particular time period and the average cost incurred by the top five performing CCGs found in the CCG's cohort for the same medical condition over the particular time period. A large difference between the two costs typically results in a high significance data value. Therefore, in this example, the significance data value may help the CCG to better identify opportunities (and/or the best opportunities) for improving the CCG's perform with respect to costs incurred for various medical conditions. This can allow the CCG to focus on those attributes of interest that can best improve the CCG's performance. As further detailed herein, the significance data value may be used in various embodiments in identifying such opportunities to a user who is viewing the information through one or more user interfaces.

Once the aggregate module has performed an analysis on each of the attribute data items, the aggregate module stores the attribute data items and corresponding analysis (e.g., generated comparison data values and/or significance data values) in one or more databases in Operation 325. This particular operation is performed in various embodiments to make the information on the attribute data items and corresponding analysis available to users to view. Accordingly, in particular embodiments, one or more user interfaces may be made available that are accessible to various user devices 110a, 110b, 110c so that users of such devices 110a, 110b, 110c may view the attribute data items and corresponding analysis on the user interface(s).

Turning now to FIG. 5, additional detail is provided on a process flow 500 involving the analysis carried out in various embodiments by the aggregate module to generate comparison data values based on an attribute data item. As previously noted, in particular embodiments, the aggregate module generates a standardized data value for each of the attributes of interest for the attribute data item in Operation 510. Again, the example of the aggregate module processing queried data from the HES dataset is used to demonstrate the operations carried out by the aggregate module.

In some embodiments, in performing this operation, the aggregate module initially generates a primary group data value for the primary data group that is associated with the attribute data item. For instance, in the example involving the HES dataset, the aggregate module may generate a direct age and sex standardized rate (DASR) for each CCG as the primary group data value for each CGG. Here, the DASR for each CCG may be determined based on groupings found within each of the CCGs such as gender and age groups. In addition, the DASR may be based on some feature that is common across all of the CCGs such as a population count feature. Thus, for example, the aggregate module may determine the DASR for a CCG as the European population for a particular group (e.g., females) divided by the population for the particular group found in the CCG (e.g., European female population/female population in the CCG). Accordingly, in particular embodiments, the aggregate module may make use of one or more standardized reference tables for identifying the populations found in the different CCGs and/or Europe for the different genders and age groups.

The aggregate module may then use the DASR for the different groupings to standardize the attributes of interest for the attribute data item. Therefore, returning to the above-noted example related to the HES dataset, the aggregate module may adjust the cost and/or activity values of a particular medical procedure incurred by a CCG using the DASR for the CCG to generate standardized cost and/or activity values. Again, as previously noted, different groupings (e.g., based on gender and/or age groups) may be utilized in some embodiments so that a further breakdown within a primary data group (e.g., a CCG) can be performed. This can allow for the data to viewed at different levels of interest within the primary data group.

In addition, in some embodiments, the aggregate module may generate one or more additional statistical data values associated with the standardized data values such as upper and lower bounds for a confidence interval. Accordingly, the upper and lower confidence interval bounds may be used to identify the significance of a standardized data value of a particular attribute of interest for a particular CCG. For example, in particular embodiments, the aggregate module may use a Chi-square or inverse Chi-square distribution in determining the upper and lower confidence interval bounds. Here, in particular embodiments, the aggregate module may be configured to lookup the Chi-square or inverse Chi-square probability value from one or more reference tables found within the database environment to help facilitate calculating the upper and lower confidence interval bounds within the database environment.

At this point, in various embodiments, the aggregate module identifies a cohort for the primary data group associated with the attribute data item in Operation 515. In particular embodiments, the aggregate module performs this particular operation by looking up the cohort for the primary data group in one or more reference tables. For instance, returning to the example, a cohort reference table may exist that identifies peer CCGs for any particular CCG. For example, the cohort reference table may be based on CCG peers that have been recognized (identified) by the NHS. Here, the cohort reference table may identify a cohort for the primary data group and this cohort can then be used in evaluating the primary data group with respect to the attributes of interest.

Accordingly, the members of the cohort are generally grouped into the cohort based on similarities between the members. For instance, such similarities may include similar demographics such as, for example, similar income levels of population, education of population, ethnicity, and/or the like. As a result of these similarities, the cohort can allow a statistical analysis to be performed on the members of a cohort in many instances so that a meaningful comparison can be carried among the members.

Once the cohort has been identified, the aggregate module in particular embodiments generates a statistical data value for the cohort with respect to each of the attributes of interest found in the attribute data item in Operation 520. In particular embodiments, the statistical data value may be based on the standardized data values generated for one or more of the primary data groups found in the cohort for the attribute of interest. For instance, returning to example involving the HES dataset, the aggregate module may generate a statistical data value for both cost and activity for the medical condition associated with the attribute data item based on the standardized cost and activity values generated for each of the top five CCGs found in the cohort. Here, the aggregate module may sum the standardized values for cost for each of the top five CCG performers found in the cohort for the medical condition and take the average, mean, median, and/or the like of the sum to arrive at the statistical data value for cost. The aggregate module may do the same for the activity.

Accordingly, in particular embodiments, the aggregate module may generate more than one statistical data value for any particular attribute of interest. For example, the aggregate module may generate a first statistical data value for the top five performing primary data groups found in the cohort and a second statistical data value for the top ten performing primary data groups found in the cohort. In addition, the aggregate module may generate the one or more statistical data values for any particular attribute of interest with respect to different groupings such as, for example, gender and/or age groups. As further discussed herein, these statistical data values can then be used in performing comparisons of the attributes of interest among the primary data groups found in the cohort. Therefore, depending on the embodiment, any number of different combinations of statistical data values with respect to the number of primary data groups and/or groupings within the primary data groups may be generated as those of ordinary skill in the art can appreciate in light of this disclosure.

At this point, the aggregate module generates one or more comparison data values for each attribute of interest found in the attribute data item in Operation 525. Here, a comparison data value represents a value generated as output in various embodiments from performing a comparison of the standardized data value for an attribute of interest for an attribute data item with the statistical data value for the attribute of interest generated for the cohort. Therefore returning to the example involving the HES dataset, the aggregate module may be configured to generate one or more comparison data values for the standardized cost for the medical condition associated with the attribute data item. For example, the aggregate module may calculate the comparison data value when the standardized cost is greater than the statistical cost as ((standardized cost−statistical cost for the top five performers found in the cohort)/100,000)*the population of the CCG associated with the attribute data item. Here, in this example, the calculation involves multiplying the difference between the standardized cost and the statistical cost by the population of the CCG to generate an actual cost value with respect to the medical condition in light of the standardized values. Accordingly, the aggregate module may perform the calculation ((standardized activity−statistical activity for the top five performers found in the cohort)/100,000)*the population of the CCG associated with the attribute data item to generate a comparison data value for standardized activity for the medical condition. Further, in some embodiments, the aggregate module may be configured to generate comparison data values for each of the attributes of interest for different numbers of primary data groups and/or different groupings found with the primary data groups.

Accordingly, the generated comparison data values may be used in various embodiments in identifying opportunities for cost savings and/or activity enhancements. For example, the comparison data value generated from comparing the standardized cost incurred by a particular CCG for a medical condition with the average standardized cost incurred by one or more CCGs in the corresponding cohort may identify an opportunity for the particular CCG to improve performance with respect cost incurred for the medical condition. Specifically, the comparison data value may represent the amount of cost the CCG must reduce to achieve a cost in line with the one or more CCGs. Therefore, the comparison data value may represent an opportunity for the CCG to reduce cost by an identified amount for the medical condition to improve performance.

In some embodiments, the aggregate module may also be configured to identify one or more significance data values for each of the attributes of interest for the attribute data item. Accordingly, these significance data values may indicate an estimated magnitude of difference as inferred based on a comparison performed between a primary data group and one or more primary data groups found in the primary data group's cohort.

For example, the aggregate module may be configured in particular embodiments to generate a significance data value for the cost incurred by a CCG for a medical condition by determining whether the lower bound of a confidence interval for the standardized cost incurred by the CCG is greater than the upper bound of a confidence interval for the average standardized cost incurred by the one or more CCGs of the cohort. If the lower bound of the confidence interval for the standardized cost incurred by the CCG is greater than the upper bound of the confidence interval for the average standardized cost incurred by the one or more CCGs of the cohort, then the aggregate module may set the significance data value to indicate the cost difference is of high significance.

In addition, the aggregate module may be configured in particular embodiments to generate a significance data value for the cost incurred by a CCG for a medical condition by determining whether the upper bound of a confidence interval for the standardized cost incurred by the CCG is less than the lower bound of a confidence interval for the average standardized cost incurred by the one or more CCGs of the cohort. If the upper bound of the confidence interval for the standardized cost incurred by the CCG is less than the lower bound of the confidence interval for the average standardized cost incurred by the one or more CCGs of the cohort, then the aggregate module may set the significance data value to indicate the cost difference is of low significance.

Here, in some embodiments, a significance data value set to a certain level (e.g., high significance) may be used in identifying which opportunities for the attributes of interest may provide the CCG with the better opportunities for the CCG to improve performance. For example, the aggregate model may generate a standardized data value for an activity with respect to the medical condition of disease of intestines for a particular CCG of three-hundred and thirty-one and a statistical data value for activity with respect to the same medical condition for the top five performers in the particular CCG's cohort of two-hundred and one. In this example, the aggregate model may generate a significance data value based on a comparison of the standardize data value and the statistical data value as high. Therefore, based on setting the significance data value to high, activity for this medical condition may be identified as an opportunity for the CCG to improve its performance. For instance, as discussed further herein, the activity information for disease of intestines for the CCG may be displayed to a user on one or more user interfaces using a particular user interface element (e.g., formatting the activity information in a particular color) to highlight to the user that the activity for the medical condition represents an opportunity for the CCG to improve performance.

With respect to the example discussed herein, the aggregate module in various embodiments may be configured to perform the same operations as described above with respect to a different primary data group type other than CCGs such as GPs. GPs (general practices) are located within the different CCGs. Each GP is identified by the NHS as belonging to a cluster and this cluster classification may be used in some embodiments in identifying a cohort for a particular GP. In addition, the number of GPs found throughout the CCGs are numerous, reaching into the thousands in some CCGs. Therefore, in some embodiments, the aggregate module may be configured to perform the analysis on a particular GP and it corresponding cohort (cluster) with respect to a large number of GPs found in the cohort. For example, the aggregate module may be configured to perform comparisons of attributes of interest for a particular GP and the top fifty percent of performers found in the cohort for the GP as opposed to the top five or ten performers.

Furthermore, the aggregate module in various embodiments may be configured to process other population datasets in addition to (or instead of) the HES dataset to perform a similar analysis on the data in these datasets as performed on the data in the HES dataset. For example, the aggregate module may also process an electronic prescribing analysis and cost tool (ePACT) dataset in some instances. The ePACT dataset includes data on medicines prescribed by primary care and hospitals in different communities. Accordingly, the aggregate module may be configured in particular embodiments to perform an analysis on the data found in the ePACT with respect to prescription costs incurred by CCGs and/or GPs for different medical conditions. Here, similar to the medical conditions, the different medications may be grouped into categories. This may be done to account for CCGs and/or GPs who may prescribe different forms of medications for the same medical condition. For example, a first GP may prescribe a brand form of a medication, while a second GP may prescribe a generic form of the medication. Therefore, placing the medications into categories helps to address such situations so that more meaningful cost comparisons can be performed across medication types as opposed to across medication names.

In addition, the aggregate module may be configured in some embodiments to perform iterations on generating the attribute data items that are to be processed for analysis. The aggregate module is configured for this reason in these particular embodiments because in many instances a medication may be used in treating multiple medical conditions. Therefore, a medication may need to be placed into multiple categories. Accordingly, the aggregate module may make use of one or more reference tables in particular embodiments to identify a medication's multiple uses for different medical conditions.

Finally, the aggregate module may be configured in various embodiments to process quality and outcomes framework (QOF) datasets. A QOF dataset provides public health information on how many patients within a CCG and/or GP have been diagnosis with a particular medical condition. The motivation behind the NHS gathering such information is that proper treatments, medications, therapies, and/or the like can be administered, resulting in high quality healthcare, if patients are properly diagnosed with medical conditions. Therefore, the aggregate module is configured in these embodiments to perform an analysis on the various CCGs and/or GPs as to their performance in properly identifying and managing patients with different medical conditions. Accordingly, the opportunities identified by the aggregate module may involve identifying a number of patients a CCG and/or GP may need to properly diagnosis and manage for a certain medical condition to improve performance with respect to the CCG's and/or GP's cohort.

As previously noted, the aggregate module may be configured in particular embodiments to store the queried data and analysis performed on the data in one or more tables in one or more databases. Storing the data and corresponding analysis in these tables may facilitate different users' access to the data and analysis in a timely and efficient manner. In particular embodiments, one or more user interfaces may accessible by a user through a display of a user computing entity so that the user may view the data and corresponding analysis displayed in various formats on the one or more user interfaces in configurations that may be helpful to the user in drawing useful information from the data and analysis. Accordingly, examples of user interfaces according to various embodiments are now provided.

Exemplary User Interfaces

Figure 6:
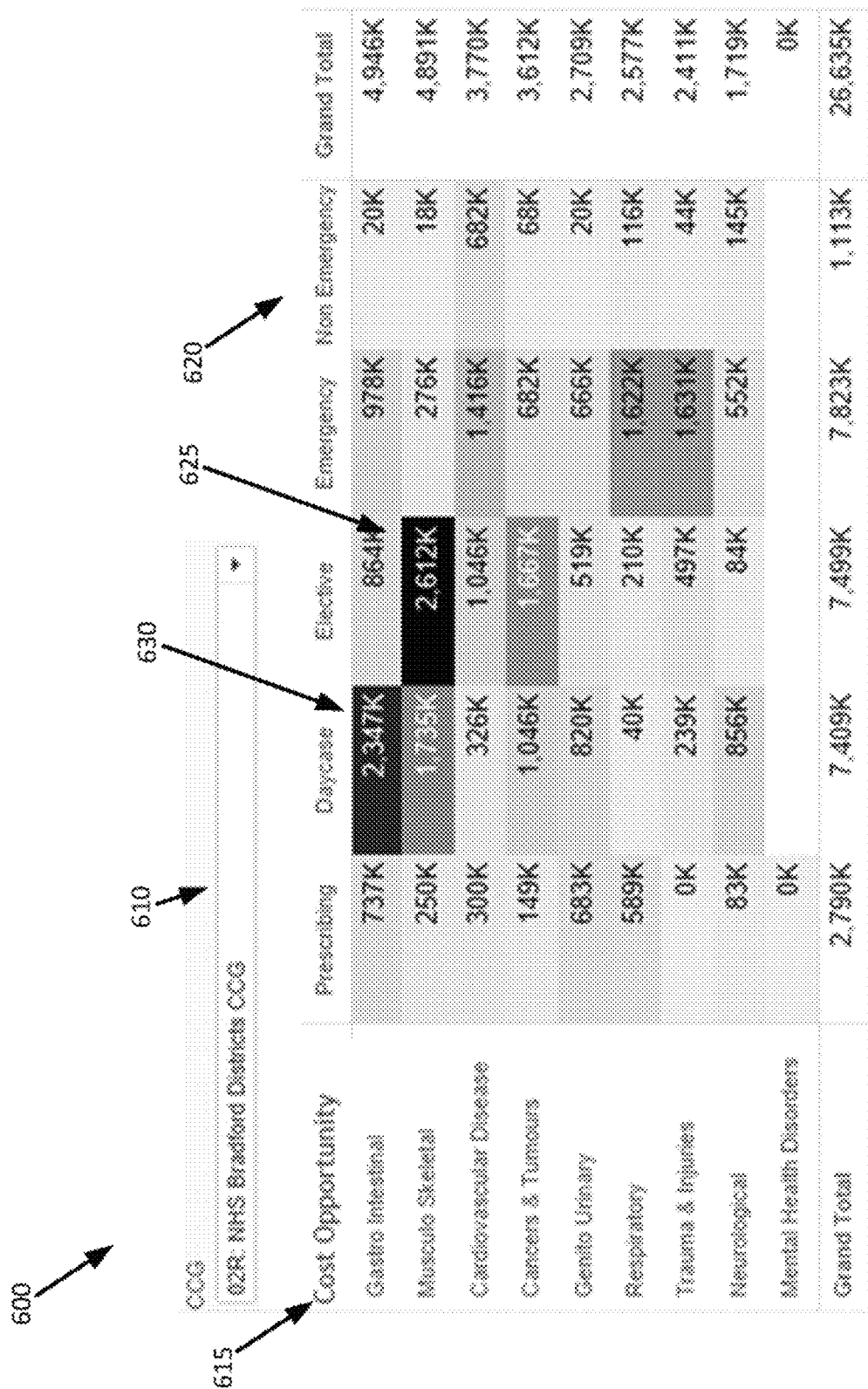

Turning now to FIG. 6, an example of a user interface 600 according to various embodiments is shown. In this example, a user interface element 610 such as a dropdown is provided so that a user can select a desired CCG to view information (e.g., content data) on the CCG. The information is provided on the user interface 600 in a table format with the different medical condition categories 615 shown as rows in the table and the different admission processes 620 shown as columns in the table. Accordingly, the table provides comparison data values in the form of costs identifying opportunities for the selected CCG (in this example, Bradford Districts) with respect to medical condition category and admission process. In this example, the table demonstrates that the best opportunities for Bradford Districts to improve performance is by decreasing costs incurred for musculoskeletal—elective (2,612K 625) and gastrointestinal—daycare (2,347K 630). For this particular example, the opportunities are calculated on Bradford Districts reaching the average of the top five comparable CCGs found in Bradford Districts' cohort. If an opportunity is shown as zero, then the CCG has already reached the average of the top five.

Figure 7:
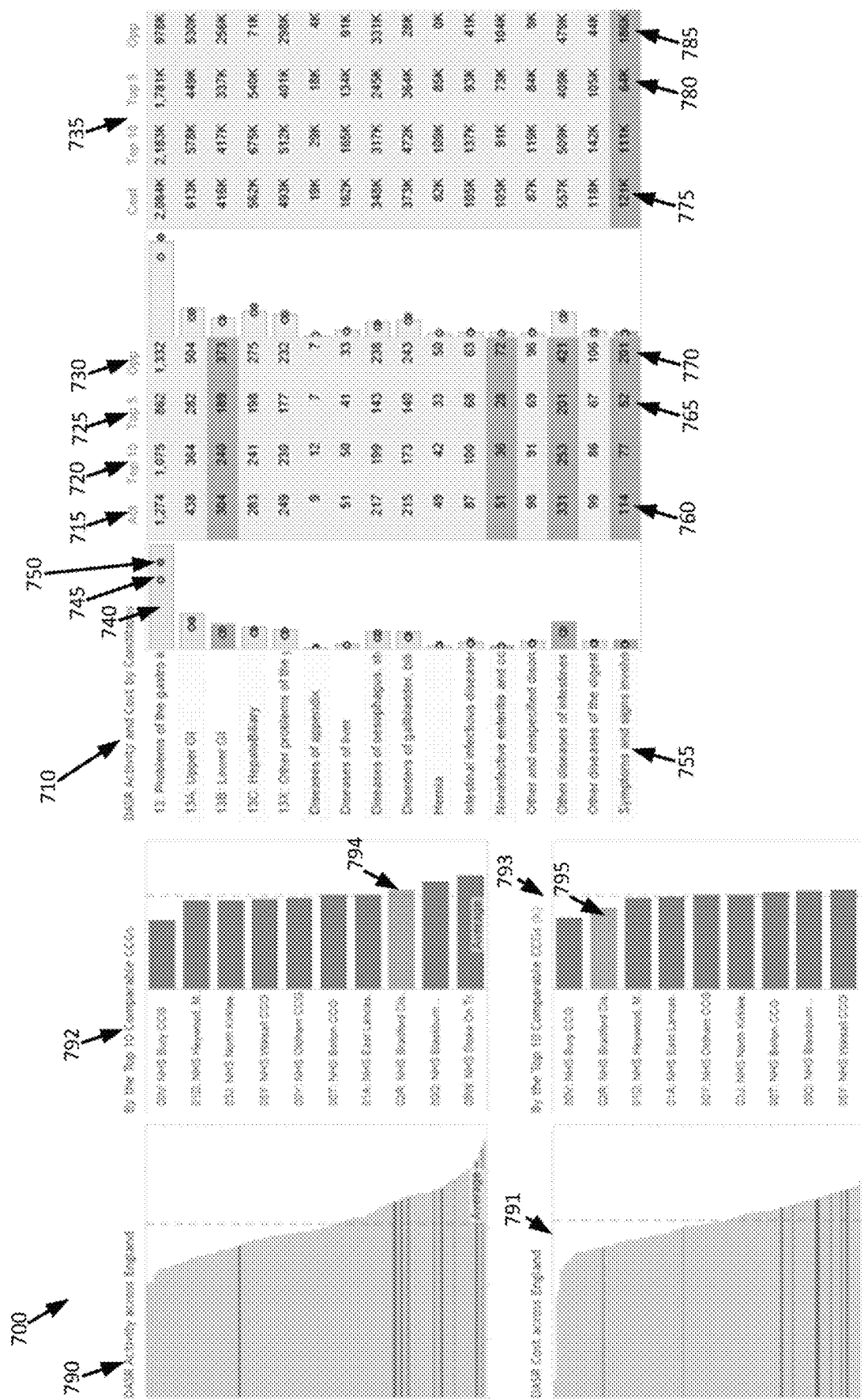

FIG. 7 shows another example of a user interface 700 provided in various embodiments. In this example, the user interface 700 is providing information on activity and cost associated with various medical conditions found in a medical condition category for a particular CCG (again, Bradford Districts). Accordingly, in particular embodiments, user interface elements such as drop down filters may be provided along the top of the user interface (not shown in FIG. 7) that allow a user to change medical condition categories, CCG, gender, age group, admissions process, and/or the like.

A list of medical conditions 710 is provided in a table on a section of the right side of the user interface 700. For each medical condition in the list of medical conditions 710, information is provided in the table on attributes of interest, in this case activity and cost associated with each medical condition. For instance, a standardized data value 715, a statistical standardized data value 720 for the top ten CCGs found in Bradford Districts' cohort, a statistical standardized data value 725 for the top five CCGs found in Bradford Districts' cohort, and a comparison data value 730 identified as an opportunity is provided with respect to the number of activities involving Bradford Districts for each of the different medical conditions found in the medical condition category. Accordingly, the same information 735 is provided for costs incurred by Bradford Districts for the different medical conditions.

In particular embodiments, the significance of Bradford Districts' standardized data value with respect to the values for the top five and/or top ten CCGs found in Bradford Districts' cohort may be displayed using one or more user interface elements. For instance, in this example, a user interface element in the form a graphical bar 740 is displayed representing the standardized data value for activity and cost for each medical condition. Within the graphical bar 740, a first indication 745 is provided identifying the top five performers' statistical standardized data value 725 and a second indication 750 is provided identifying the top ten performers' statistical standardized data value 720. In addition, in some embodiments, color coding may be used as a user interface element to demonstrate the significance of the standardized data value. For example, rows for medical conditions may be shown in a first color (e.g., orange) to identify those standardized activities and/or costs that are significantly high, while rows for medical conditions may be shown in a second, different color (grey) to identify those standardized activities and/or costs that are significantly low. Rows shown in a third color (white) may identify those standardized activities and/or costs having no significance.

Accordingly, these values may be used in identifying opportunities for the CCG to improve performance with respect to activities and costs for the different medical conditions. As an example, the final row 755 in the table describes symptoms and signs involving the digestive system and abdomen. Here, Bradford Districts' standardized activity is one-hundred and fourteen 760 compared to the top five average of fifty-two 765. Here, the different between these two values may identify an opportunity for Bradford Districts to improve their performance in treating patients for digestive system and abdomen conditions. Specifically, for Bradford Districts to improve their performance and bring their rate down from one-hundred and fourteen 760 to fifty-two 765, they need to treat two-hundred and one 770 less patients for this medical condition over the applicable time period. The same can be said for costs. Bradford Districts' standard cost is £121 k 775 compared to the top five average of £64 k 780. Therefore, for Bradford Districts to improve their performance and reduce from £121 k 775 to £64 k 780, they require an expenditure decrease of £186 k 785.

In particular embodiments, the row of medical conditions (e.g., medical condition identifiers/labels) may be selectable, so that when a user selects on a particular row for a medical condition, the charts shown on a section of the user interface 700 on the left side change to focus on that particular medical condition. The two national charts 790, 791 on the far left of the user interface 700 demonstrate the national position (e.g., all CCGs) for the selected medical condition for Bradford Districts and the top ten comparable CCGs found in Bradford Districts' cohort, while the other two charts 792, 793 shown on the left of the user interface 700 focus on just the top ten comparable CCGs. In these two charts 792, 793, Bradford Districts' position 794, 795 is shown relative to the other CCGs found in the top ten most similar to Bradford Districts with respect to activity and cost. Accordingly, these charts 792, 793 show that Bradford Districts' activity is above the average for the CCGs deemed to be the top ten most similar to Bradford Districts and sits at the high end compared to the top ten CCGs, whereas the cost of Bradford Districts is at the lower end for the selected medical condition. Similar identifiers for Bradford Districts and the top ten CCGs are shown in the two national charts 790, 791.

Figure 8:
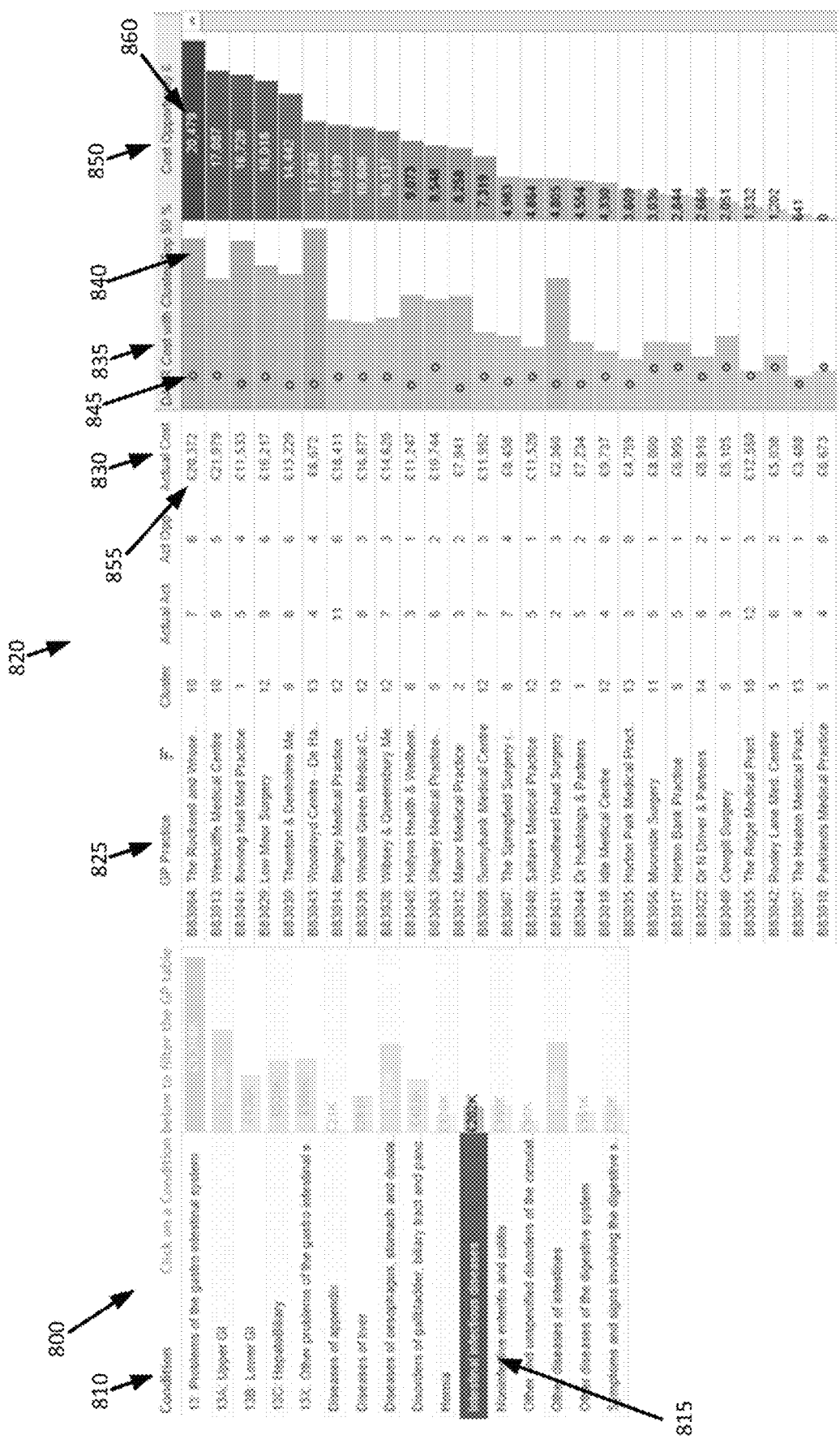

FIG. 8 shows an example of a user interface 800 with similar information as to the information shown in FIG. 7 but on a GP level within a CCG (e.g., within in particular, Bradford Districts). In this example, a table listing the medical conditions 810 is provided on a section of the left side of the user interface 800 in which each of the medical conditions 810 is selectable (e.g., identifiers/labels for the conditions) so that when a user selects on a condition (e.g., intestinal infectious diseases) 815, the information provided in the table 820 on a section of the right side of the user interface 800 is filtered accordingly. In this example, the table 820 provides a column 825 of the GPs found within Bradford Districts along with a column 830 for the actual cost incurred by each GP for the selected medical condition 815. The cost opportunities are provided in another column 850 of the table 820 and each cost opportunity is based on the variation from the standardized data value (e.g., standardized cost) compared with the statistical data value (e.g., averaged standardized cost) for the top fifty percent of the GP's cohort. In this example, the GPs are listed in the table 820 in descending order with respect to opportunity costs. In addition, the column 830 for the actual cost incurred by the GP for the selected medical condition 815 is displayed along with a column 835 displaying a user interface element in the form of a graphical bar 840 for each GP representing the standardized cost incurred by the GP for the selected medical condition. An indication 845 is shown on the graphical bar 840 for the average standardized cost for the top fifty percent of the GP's cohort (cluster).

Thus, looking at the top row of the table, the first GP listed has an actual cost of £20,372 855 for the selected medical condition 815 and an opportunity cost of £20,479 860 to reach the average cost incurred by the top fifty percent of the GPs found in the GP's cohort. Therefore, in this instance, the GP would be required to essentially remove the actual cost 855 the GP is currently incurring for the selected medical condition 815 to reach the average cost incurred by the top fifty percent of the GPs found in the GP's cohort (cluster).

Figure 9:
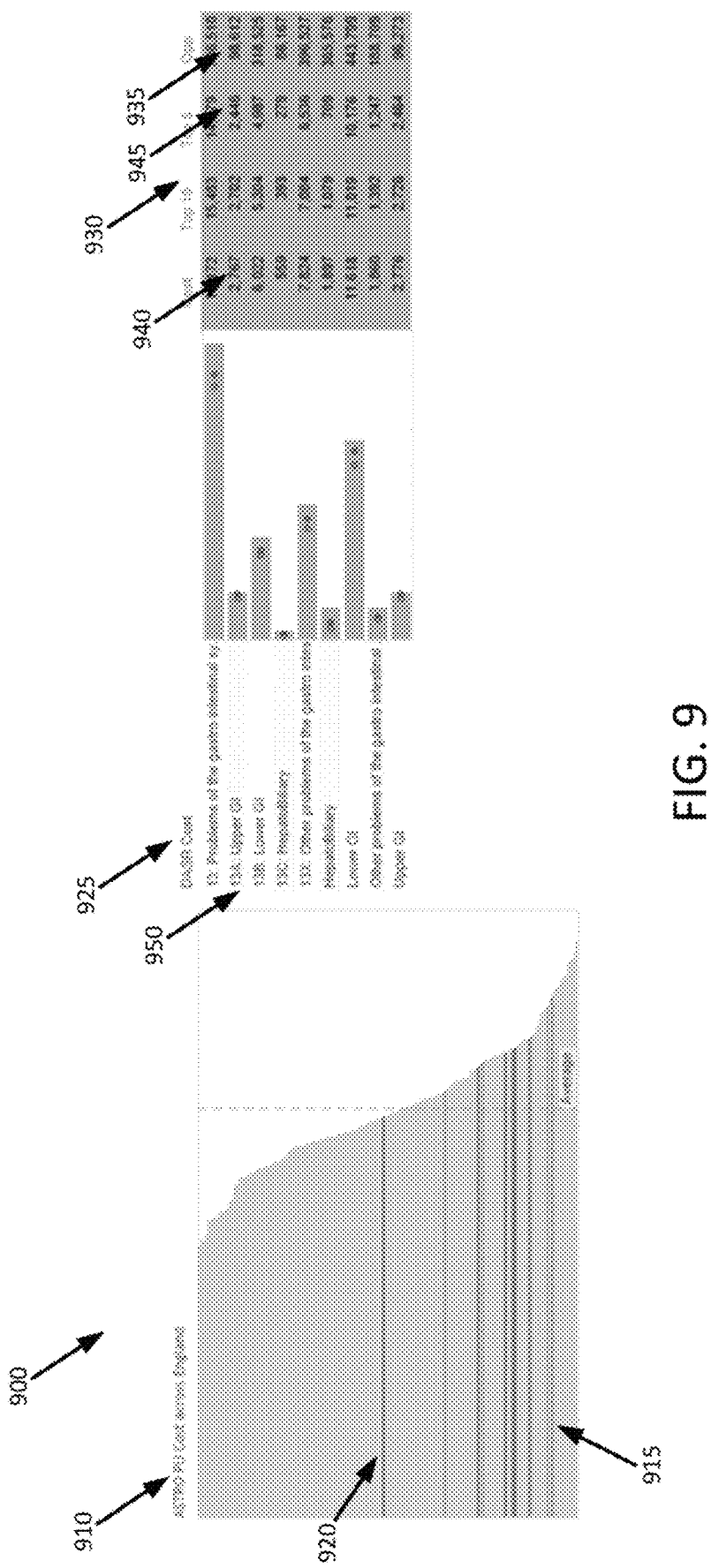

Turning now to FIG. 9, an example of a user interface 900 is shown providing prescription information on cost opportunities in a particular medical condition category for a CCG (again, Bradford Districts) to reach the average cost incurred for medications prescribed to patients by the top five CCGs found in Bradford Districts' cohort with respect to medical conditions found in the category. Accordingly, the user interface 900 provides a chart 910 displaying prescription cost nationally for a medical condition selected for the category by a user from the medical conditions listed in the table 925 displayed on a section of the right side of the user interface 900. An indication (e.g., a line) 915 is provided in the chart 910 identifying Bradford Districts' performance with respect to the other CCGs in England. In addition, indications 920 are provided showing the top ten performing CCGs in Bradford Districts' cohort. Therefore, as one can see, Bradford Districts is incurring higher prescription cost for the selected medical condition than incurred by many of the other CCGs in England. The table 925 provided on the section of the right side of the user interface 900 lists the individual medical conditions found in the medical condition category along with similar cost information 930 as described with respect to FIG. 7. For instance, in this example, Bradford Districts would need to save £98,612 935 over the applicable time period to decrease their rate from £2,767 940 to £2,446 945 for Upper GI 950.

Figure 10:
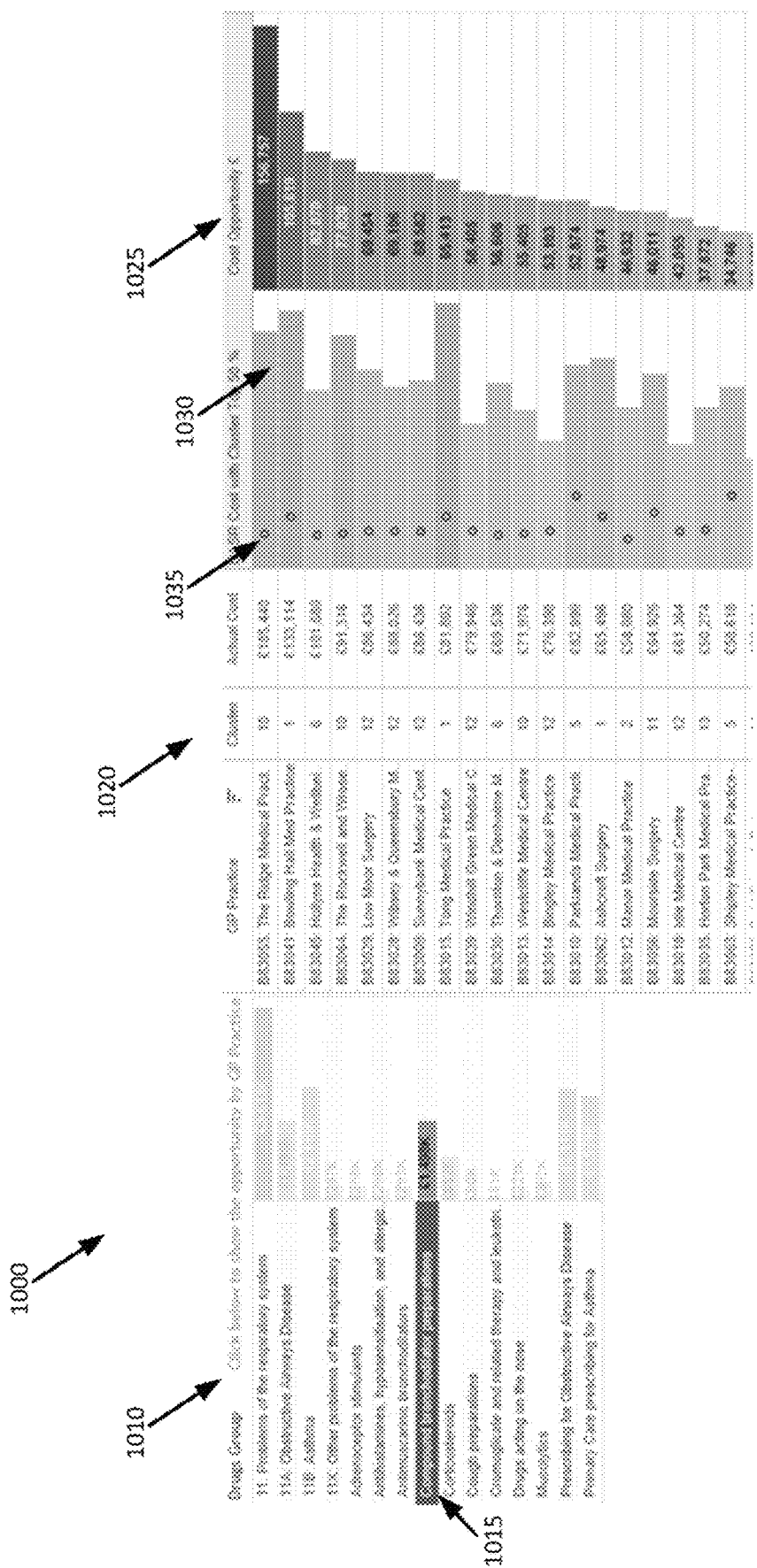

Turning now to FIG. 10, this figure shows an example of a user interface 1000 providing prescription information within a medical condition category on cost opportunities for different prescription drug categories for a CCG (again, Bradford Districts) on a GP level. That is to say, the user interface 1000 in this example provides cost opportunities with respect to the various prescription drug categories used within the medical condition category for GPs found in Bradford Districts to reach the average cost incurred for medications prescribed to patients in a particular drug category by the top fifty percent of the GPs found in a particular GP's cohort (cluster). Here, the user interface 1000 provides a table 1010 listing the different prescription drug categories that are selectable (e.g., indicators/labels for the prescription drug categories that are selectable). As the reader may recall, in particular embodiments, individual prescription drugs may be grouped into categories to better recognize common use of similar drugs across GPs. Accordingly, when a user selects a particular prescription drug category (e.g., compound bronchodilator preparations) 1015, cost opportunity information for the various GPs found in Bradford Districts is displayed in a table 1020 provided on a section of the right side of the user interface 1000. Similar to the user interface 800 shown in FIG. 8, the table 1020 provides the GPs in descending order with respect to the opportunity cost 1025 for each GP to reach the average cost incurred by the top fifty percent of GPs in the GP's cohort (cluster). In addition, the table 1020 provides a user interface element in the form of a graphical bar 1030 for each GP representing the GP's standardized cost and an indication 1035 on the graphical bar 1030 showing the average standardized cost incurred by the top fifty percent of the GPs found in the GP's cohort.

Figure 11:
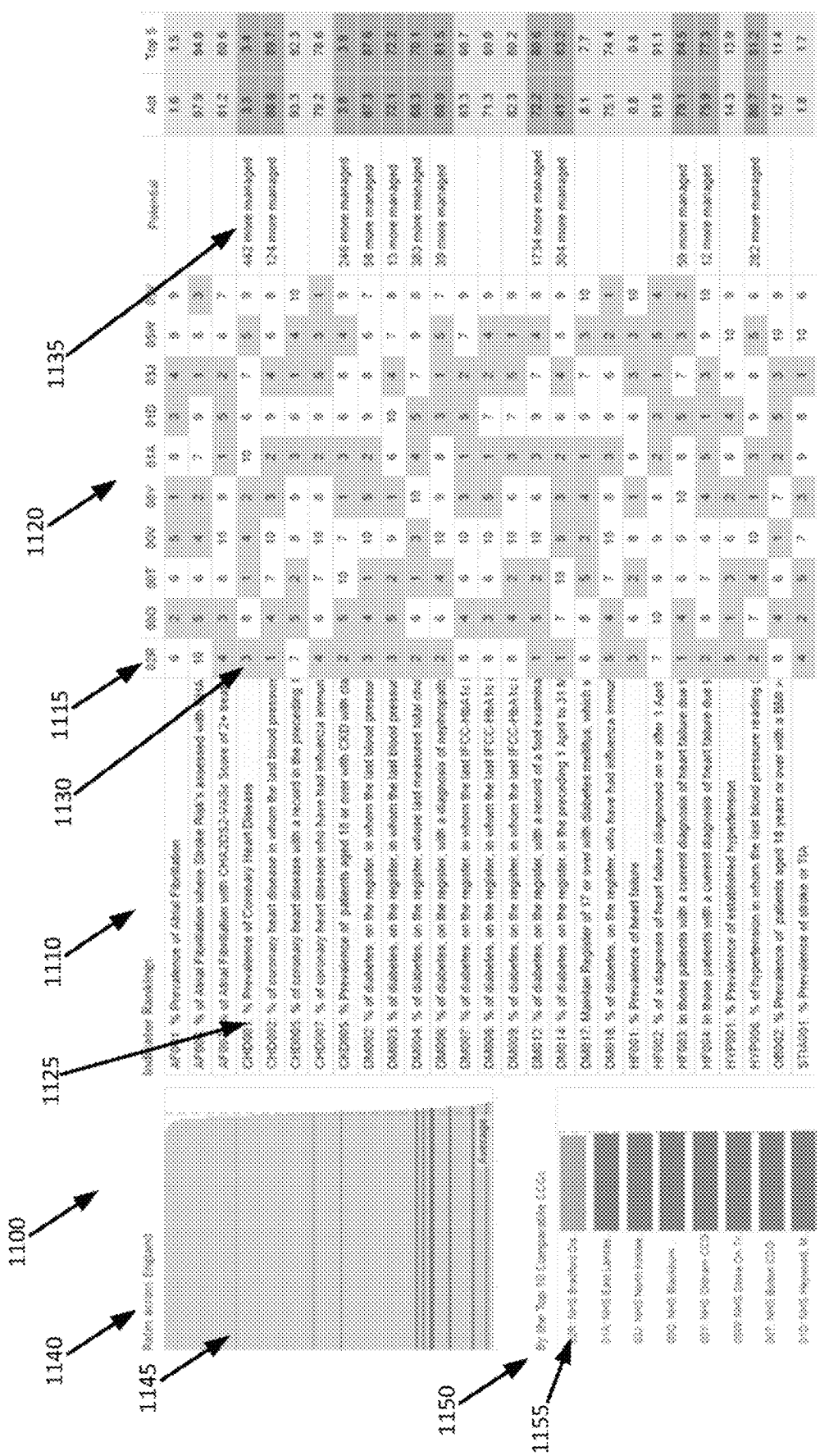

Turning now to FIG. 11, this figure provides an example of a user interface 1100 displaying information gathered from QOF data for a particular CCG (again, Bradford Districts). On a section of the right side of the user interface 1100, a table 1110 is provided listing the different indicators for medical conditions found within the QOF data. As the reader may recall, QOF data provides public health information on how many patients within a CCG and/or GP have been diagnosis with a particular medical condition. Therefore, as depicted in FIG. 11, a high ranking for a particular indicator demonstrates the CCG is performing well in identifying and managing patients with the corresponding medical condition with respect to peer CCGs found in the CCG's cohort.

Accordingly, the table 1110 provides Bradford Districts' ranking along with the rankings for the top ten CCGs found in Bradford Districts' cohort for each indicator. Bradford Districts' ranking for each indicator is provided in the first column 1115 of the table 1110, while the other columns 1120 provide the rankings for the other CCGs found in the top ten CCGs for the cohort. Therefore, looking at the indicator "Prevalence of Coronary Heart Disease" 1125, one can see that Bradford Districts has a ranking of three 1130, indicating Bradford Districts is in the bottom half of the top ten CCGs for the cohort. Therefore, this ranking 1130 may identify an opportunity for Bradford Districts to improve its performance with respect to identifying and managing patients with coronary heart disease. Specifically, in this instance, the table 1110 indicates that Bradford Districts would need to recognize and manage four-hundred and forty-two more patients 1135 for coronary heart disease in the applicable time period to move into the top five of the rankings for this indicator.

Accordingly, in particular embodiments, the indicators provided in the table 1110 are selectable (e.g., the labels for the indicators) and, as a result of a user selecting a particular indicator, the charts 1140, 1150 shown on a section of the left side of the user interface 1100 are updated based on the selected indicator. The first chart 1140 provided on the left side of the user interface 1100 displays a performance of CCGs nationally with respect to the selected indicator. Accordingly, an indication (e.g., a line) 1145 is provided in the chart 1140 identifying Bradford Districts' performance ranking in relation to the other CCGs located in England for the selected indicator. Indications may also be provided for the top ten CCGs' performance rankings. The second chart 1150 provides a ranking of the top ten CCGs found in the cohort for the selected indicator. Here, Bradford Districts 1155 is displayed in a different color than the other CCGs to highlight its ranking to the user.

Figure 12:
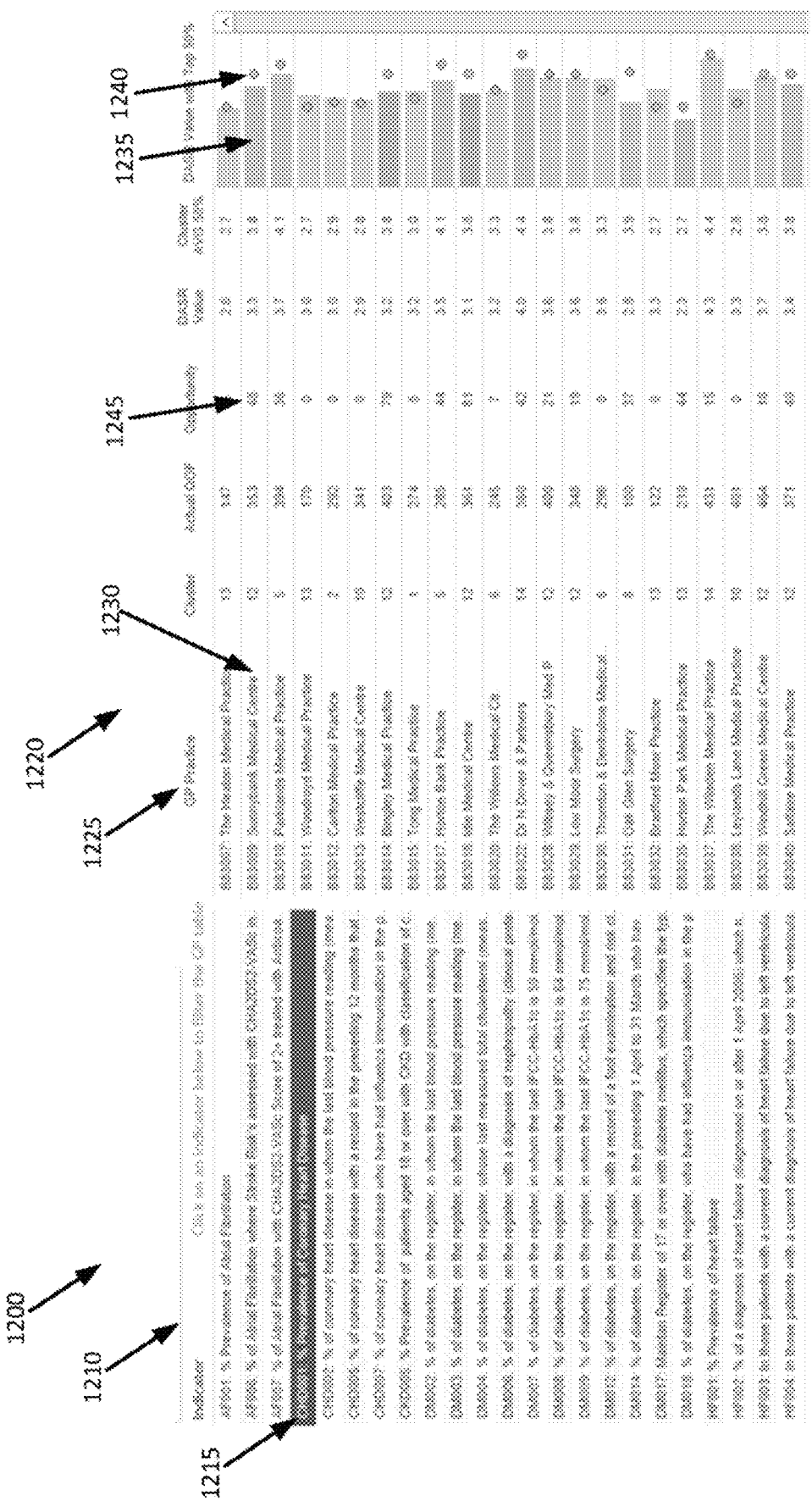

Finally, FIG. 12 provides an example of a user interface 1200 displaying QOF information on the GP level for a particular CCG (again, Bradford Districts). The user interface 1200 provides a list of the indicators 1210 that are selectable by a user. Accordingly, the selection of a particular indicator (e.g., "Prevalence of Coronary Heart Disease") 1215 filters the table 1220 displayed on a section of the right side of the user interface 1200 for the different GPs found within Bradford Districts based on the selected indicator 1215. Here, the table 1220 includes a list of the GPs 1225 along with performance data for each GP based on the selected indicator 1215. Therefore, looking at the GP Sunnybank Medical Centre 1230, a user interface element in the form of a graphical bar 1235 is provided representing Sunnybank Medical Centre's standardized performance for the selected indicator along with an indication 1240 of the top fifty percent of the GPs' average standardized performance. Therefore, the discrepancy between the two depicted measures may identify to the user an opportunity within Bradford Districts, and specifically the Sunnybank Medical Centre 1230 within Bradford Districts, to improve performance with respect to identifying and managing patients with coronary heart disease. Accordingly, the Sunnybank Medical Centre 1230 needs to identify and manage forty-eight 1245 more patients with coronary heart disease to improve performance to move into the top fifty percent of the GPs found in Bradford Districts.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method comprising:
executing, by one or more processors, at least one structured query language (SQL) procedure within a database environment to aggregate a plurality of records associated with a plurality of primary data groups into a plurality of attribute data items, wherein: (i) an attribute data item of the plurality of attribute data items (a) is associated with at least one of an attribute data item identifier, an associated aggregate data group of a plurality of aggregate data groups, or an associated primary data group of the plurality of primary data groups and (b) comprises an aggregate data value for an attribute of interest of one or more attributes of interest, and (ii) the aggregate data value for the attribute of interest in the attribute data item is determined based at least in part on a subset of data values for the attribute of interest in the plurality of records of a population dataset that relate to the associated aggregate data group for the attribute data item and the associated primary data group for the attribute data item;
for the attribute data item:
executing, by the one or more processors, the at least one SQL procedure within the database environment to generate a standardized data value for the attribute of interest with respect to the attribute data item based at least in part on the aggregate data value for the attribute of interest;
executing, by the one or more processors, the at least one SQL procedure within the database environment to identify a cohort for the attribute data item based at least in part on the associated primary data group for the attribute data item, wherein the cohort comprises one or more peer primary data groups of the plurality of primary data groups for the attribute data item;
executing, by the one or more processors, the at least one SQL procedure within the database environment to generate a statistical data value for the attribute of interest with respect to the cohort for the attribute data item, wherein the at least one SQL procedure is configured to generate the statistical data value based at least in part on the standardized data value for one or more of the one or more peer primary data groups for the attribute data item; and
executing, by the one or more processors, the at least one SQL procedure within the database environment to generate a comparison data value for the attribute of interest with respect to the attribute data item, wherein the comparison data value represents a comparison between the standardized data value generated for the attribute of interest for the attribute data item and the statistical data value generated for the attribute of interest with respect to the cohort for the attribute data item; and
providing, by the one or more processors, a user interface configured for display via a user computing entity, wherein the user interface comprises, for the attribute data item, (i) the attribute data item identifier and (ii) the comparison data value for the attribute of interest.

2. The method of claim 1, wherein: (i) the at least one SQL procedure is configured to generate the standardized data value for the attribute of interest with respect to the attribute data item based at least in part on a selected primary group data value, and (ii) the selected primary group data value is selected from at least one standardized reference table hosted within the database environment based at least in part on the associated primary data group for the attribute data item.

3. The method of claim 1, wherein: (i) the one or more peer primary data groups comprise a proper subset of the plurality of primary data groups that are deemed similar to the associated primary data group for the attribute data item, and (ii) the at least one SQL procedure is configured to identity the cohort by selecting the cohort from at least one cohort reference table hosted within the database environment based at least in part on the associated primary data group for the attribute data item.

4. The method of claim 1 further comprising, for the attribute data item, executing the at least one SQL procedure within the database environment to generate a significance data value for the attribute of interest, wherein:
the significance data value for the attribute of interest identifies an estimated magnitude of difference between the standardized data value and the statistical data value, and
the user interface is configured to display a user interface element for the attribute of interest in which the significance data value comprises a certain data value.

5. The method of claim 4, wherein the user interface element comprises at least one of a particular color for the attribute of interest indicating the significance data value or a graphical representation for the attribute of interest indicating the significant data value.

6. The method of claim 1, further comprising, for the attribute data item, executing the at least one SQL procedure within the database environment to generate a ranking for the attribute of interest, wherein:
the ranking comprises two or more peer primary data groups associated with the cohort listed in an order based at least in part on the standardized data value for the attribute of interest for the attribute data item for each of the two or more peer primary data groups associated with the cohort, and
the user interface is configured to display the ranking for the attribute of interest for the attribute data item in response to receiving a selection of the attribute data item identifier for the attribute data item by a user via the user interface.

7. The method of claim 6, further comprising, for the attribute data item, executing the at least one SQL procedure within the database environment to generate a population ranking for the attribute of interest with respect to the attribute data item, wherein:
the population ranking for the attribute of interest with respect to an attribute data item describes an ordering of each primary data group in the plurality of primary data groups that is determined based at least in part on the standardized data value for the attribute of interest for the attribute data item for each primary data group of the plurality of primary data groups, and
the user interface is configured to display the population ranking for the attribute of interest for the attribute data item in response to receiving the selection of the attribute data item identifier for the attribute data item by the user via the user interface, and the user interface is configured to display one or more peer primary data groups associated with the cohort in the population ranking for the attribute of interest.

8. The method of claim 7, wherein the user interface comprises (i) the comparison data value for the attribute of interest, (ii) the ranking for the attribute of interest for the attribute data item, and (iii) the population ranking for the attribute of interest for the attribute data item on non-overlapping portions of the user interface.

9. The method of claim 1, wherein the user interface (i) comprises each standardized data value as a selectable user interface element for the attribute of interest and (ii) is configured to display the aggregate data value for the attribute of interest for the attribute data item in response to receiving a selection of the selectable user interface element for the standardized data value for the particular attribute of interest by a user via the user interface.

10. The method of claim 1, wherein:
each primary data group of the plurality of primary data groups describes a clinical commissioning group,
each aggregate data group of the plurality of aggregate data groups describes a group of medical conditions,
the attribute data item comprises an individual medical condition associated with the group of medical conditions described by the associated aggregate data group that is associated with the attribute data item, and
the one or more attributes of interest comprise: a cost associated with the individual medical condition that is described by the attribute data item with respect to the clinical commissioning group that is described by the associated primary data group that is associated with the attribute data item and a number of patient activities associated with the individual medical condition that is described by the attribute data item with respect to the clinical commissioning group that is described by the associated primary data group that is associated with the attribute data item.

11. An apparatus comprising one or more processors and memory including a computer program code, the memory and the computer program code configured to, with the one or more processors, cause the apparatus to:
execute at least one structured query language (SQL) procedure within a database environment to aggregate a plurality of records associated with a plurality of primary data groups into a plurality of attribute data items, wherein: (i) an attribute data item of the plurality of attribute data items (a) is associated with at least one of an attribute data item identifier, an associated aggregate data group of a plurality of aggregate data groups, or an associated primary data group of the plurality of primary data groups and (b) comprises an aggregate data value for an attribute of interest of one or more attributes of interest, and (ii) the aggregate data value for the attribute of interest in the attribute data item is determined based at least in part on a subset of data values for the attribute of interest in the plurality of records of a population dataset that relate to the associated aggregate data group for the attribute data item and the associated primary data group for the attribute data item;
for the attribute data item:
execute the at least one SQL procedure within the database environment to generate a standardized data value for the attribute of interest with respect to the attribute data item based at least in part on the aggregate data value for the attribute of interest;

execute the at least one SQL procedure within the database environment to identify a cohort for the attribute data item based at least in part on the associated primary data group for the attribute data item, wherein the cohort comprises one or more peer primary data groups of the plurality of primary data groups for the attribute data item;

execute the at least one SQL procedure within the database environment to generate a statistical data value for the attribute of interest with respect to the cohort for the attribute data item, wherein the at least one SQL procedure is configured to generate the statistical data value based at least in part on the standardized data value for one or more of the one or more peer primary data groups for the attribute data item; and execute the at least one SQL procedure within the database environment to generate a comparison data value for the attribute of interest with respect to the attribute data item, wherein the comparison data value represents a comparison between the standardized data value generated for the attribute of interest for the attribute data item and the statistical data value generated for the attribute of interest with respect to the cohort for the attribute data item; and provide a user interface configured for display via a user computing entity, wherein the user interface comprises, for the attribute data item, (i) the attribute data item identifier and (ii) the comparison data value for the attribute of interest.

12. The apparatus of claim 11, wherein: (i) the at least one SQL procedure is configured to generate the standardized data value for the attribute of interest with respect to the attribute data item based at least in part on a selected primary group data value, and (ii) the selected primary group data value is selected from at least one standardized reference table hosted within the database environment based at least in part on the associated primary data group for the attribute data item.

13. The apparatus of claim 11, wherein: (i) the one or more peer primary data groups comprise a proper subset of the plurality of primary data groups that are deemed similar to the associated primary data group for the attribute data item, and (ii) the at least one SQL procedure is configured to identify the cohort by selecting the cohort from at least one cohort reference table hosted within the database environment based at least in part on the associated primary data group for the attribute data item.

14. The apparatus of claim 11, wherein, for the attribute data item, the memory and the computer program code are configured to with the one or more processors, cause the apparatus to execute the at least one SQL procedure within the database environment to generate a significance data value for the attribute of interest, wherein:

the significance data value for the attribute of interest identifies an estimated magnitude of difference between the standardized data value and the statistical data value, and the user interface is configured to display a user interface element for the attribute of interest in which the significance data value comprises a certain data value.

15. The apparatus of claim 11, wherein, for the attribute data item, the memory and the computer program code are configured to, with the one or more processors, cause the apparatus to execute the at least one SQL procedure within the database environment to generate a ranking for the attribute of interest, wherein:

the ranking comprises two or more peer primary data groups associated with the cohort listed in an order based at least in part on the standardized data value for the attribute of interest for the attribute data item for each of the two or more peer primary data groups associated with the cohort, and the user interface is configured to display the ranking for the attribute of interest for the attribute data item in response to receiving a selection of the attribute data item identifier for the attribute data item by a user via the user interface.

16. A non-transitory computer storage medium comprising instructions configured to cause one or more processors to at least perform operations configured to:

execute at least one structured query language (SQL) procedure within a database environment to aggregate a plurality of records associated with a plurality of primary data groups into a plurality of attribute data items, wherein: (i) an attribute data item of the plurality of attribute data items (a) is associated with at least one of an attribute data item identifier, an associated aggregate data group of a plurality of aggregate data groups, or an associated primary data group of the plurality of primary data groups and (b) comprises an aggregate data value for an attribute of interest of one or more attributes of interest, and (ii) the aggregate data value for the attribute of interest in the attribute data item is determined based at least in part on a subset of data values for the attribute of interest in the plurality of records of a population dataset that relate to the associated aggregate data group for the attribute data item and the associated primary data group for the attribute data item;

for the attribute data item:

execute the at least one SQL procedure within the database environment to generate a standardized data value for the attribute of interest with respect to the attribute data item based at least in part on the aggregate data value for the attribute of interest;

execute the at least one SQL procedure within the database environment to identify a cohort for the attribute data item based at least in part on the associated primary data group for the attribute data item, wherein the cohort comprises one or more peer primary data groups of the plurality of primary data groups for the attribute data item;

execute the at least one SQL procedure within the database environment to generate a statistical data value for the attribute of interest with respect to the cohort for the attribute data item, wherein the at least one SQL procedure is configured to generate the statistical data value based at least in part on the standardized data value for one or more of the one or more peer primary data groups for the attribute data item; and execute the at least one SQL procedure within the database environment to generate a comparison data value for the attribute of interest with respect to the attribute data item, wherein the comparison data value represents a comparison between the standardized data value generated for the attribute of interest for the attribute data item and the statistical data value generated for the attribute of interest with respect to the cohort for the attribute data item; and provide a user interface configured for display via a user computing entity, wherein the user interface comprises, for the attribute data item, (i) the attribute data item identifier and (ii) the comparison data value for the attribute of interest.

17. The non-transitory computer storage medium of claim 16, wherein: (i) the at least one SQL procedure is configured to generate the standardized data value for the attribute of interest with respect to the attribute data item based at least in part on a selected primary group data value, and (ii) the selected primary group data value is selected from at least one standardized reference table hosted within the database environment based at least in part on the associated primary data group for the attribute data item.

18. The non-transitory computer storage medium of claim 16, wherein: (i) the one or more peer primary data groups comprise a proper subset of the plurality of primary data groups that are deemed similar to the associated primary data group for the attribute data item, and (ii) the at least one SQL procedure is configured to identify the cohort by selecting the cohort from at least one cohort reference table hosted within the database environment based at least in part on the associated primary data group for the attribute data item.

19. The non-transitory computer storage medium of claim 16, wherein, for the attribute data item, the instructions are configured to cause the one or more processors to at least perform operations configured to execute the at least one SQL procedure within the database environment to generate a significance data value for the attribute of interest, wherein:
    the significance data value for the attribute of interest identifies an estimated magnitude of difference between the standardized data value and the statistical data value, and
    the user interface is configured to display a user interface element for the attribute of interest in which the significance data value comprises a certain data value.

20. The non-transitory computer storage medium of claim 16, wherein, for the attribute data item, the instructions are configured to cause the one or more processors to at least perform operations configured to execute the at least one SQL procedure within the database environment to generate a ranking for the attribute of interest, wherein:
    the ranking comprises two or more peer primary data groups associated with the cohort listed in an order based at least in part on the standardized data value for the attribute of interest for the attribute data item for each of the two or more peer primary data groups associated with the cohort, and
    the user interface is configured to display the ranking for the attribute of interest for the attribute data item in response to receiving a selection of the attribute data item identifier for the attribute data item by a user via the user interface.

* * * * *

UNITED STATES PATENT AND TRADEMARK OFFICE
CERTIFICATE OF CORRECTION

PATENT NO. : 11,789,979 B2
APPLICATION NO. : 17/805501
DATED : October 17, 2023
INVENTOR(S) : Imran Siddiq Page 1 of 1

It is certified that error appears in the above-identified patent and that said Letters Patent is hereby corrected as shown below:

In the Claims

In Column 36, Line 16, Claim 9, delete "the particular attribute" and insert -- the attribute --, therefor.

Signed and Sealed this
Second Day of January, 2024

Katherine Kelly Vidal
*Director of the United States Patent and Trademark Office*